(12) United States Patent
Xue et al.

(10) Patent No.: US 11,265,728 B2
(45) Date of Patent: Mar. 1, 2022

(54) TIGHT FREQUENCY REUSE COLORING FOR NEW RADIO-UNLICENSED (NR-U)

(71) Applicant: QUALCOMM INCORPORATED, San Diego, CA (US)

(72) Inventors: Yisheng Xue, San Diego, CA (US); Aleksandar Damnjanovic, Del Mar, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 45 days.

(21) Appl. No.: 16/588,056

(22) Filed: Sep. 30, 2019

(65) Prior Publication Data

US 2020/0137584 A1    Apr. 30, 2020

Related U.S. Application Data

(60) Provisional application No. 62/749,899, filed on Oct. 24, 2018.

(51) Int. Cl.
*H04W 16/14* (2009.01)
*H04W 24/08* (2009.01)
*H04W 28/26* (2009.01)
*H04W 72/08* (2009.01)
*H04W 74/08* (2009.01)

(52) U.S. Cl.
CPC .......... *H04W 16/14* (2013.01); *H04W 24/08* (2013.01); *H04W 28/26* (2013.01); *H04W 72/082* (2013.01); *H04W 74/0808* (2013.01)

(58) Field of Classification Search
None
See application file for complete search history.

(56) References Cited

U.S. PATENT DOCUMENTS

| | | |
|---|---|---|
| 2015/0098349 A1 | 4/2015 | Wei et al. |
| 2017/0055291 A1* | 2/2017 | Gorokhov ............ H04W 16/14 |
| 2017/0118725 A1* | 4/2017 | Chu .................. H04W 72/0446 |
| 2018/0098225 A1 | 4/2018 | Damnjanovic et al. |
| 2018/0132140 A1 | 5/2018 | Yoo et al. |
| 2018/0249380 A1 | 8/2018 | Zhang et al. |
| 2020/0359415 A1* | 11/2020 | Park ..................... H04W 72/10 |

OTHER PUBLICATIONS

International Search Report and Written Opinion—PCT/US2019/053970—ISA/EPO—dated Dec. 20, 2019.

* cited by examiner

*Primary Examiner* — Mansour Oveissi
(74) *Attorney, Agent, or Firm* — Liem T. Do

(57) ABSTRACT

Wireless communications systems and methods related to communications in an unlicensed spectrum with tight frequency reuse color coding are provided. A first wireless communication device communicates, with a second wireless communication device, a first reservation signal to reserve a first transmission opportunity (TXOP) in a spectrum shared by a plurality of network operating entities. The first reservation signal includes a first waveform sequence identifying at least a first network operating entity of the plurality of network operating entities associated with the first wireless communication device and the second wireless communication device. The first wireless communication device communicates, with the second wireless communication device, a first communication signal in the spectrum during the TXOP.

30 Claims, 11 Drawing Sheets

TIGHT FREQUENCY REUSE COLORING FOR NEW RADIO-UNLICENSED (NR-U)

CROSS REFERENCE TO RELATED APPLICATIONS

The present application claims priority to and the benefit of U.S. Provisional Patent Application No. 62/749,899, filed Oct. 24, 2018, which is hereby incorporated by reference in its entirety as if fully set forth below and for all applicable purposes.

TECHNICAL FIELD

This application relates to wireless communication systems, and more particularly to providing tight frequency reuse color coding techniques for multiple network operating entities to share a spectrum (e.g., an unlicensed spectrum) for communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR can be deployed over a licensed spectrum, a shared spectrum, and/or an unlicensed spectrum. The deployment of NR over a shared spectrum is referred to as NR-SS. The deployment of NR over an unlicensed spectrum is referred to as NR-U. Both NR-SS and NR-U may utilize listen-before-talk (LBT) procedures to avoid collisions among network operating entities sharing a spectrum for communications. However, in NR-SS, the network operating entities may share a spectrum in a coordinated synchronous manner, whereas in NR-U, the network operating entities may share a spectrum in an asynchronous manner. For instances, in NR-SS, the coordinated synchronous sharing may be based on a common transmission timeline or slot structure including time periods defined for each operating entity to perform clear channel assessment (CCA). On the other hand, in NR-U, each operating entity may perform CCA based on the operating entity's own timeline.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication is provided. The method includes communicating, by a first wireless communication device with a second wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the first wireless communication device and the second wireless communication device; and communicating, by the first wireless communication device with the second wireless communication device, a first communication signal in the spectrum during the TXOP.

In an additional aspect of the disclosure, an apparatus includes a transceiver configured to communicate, with a first wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the apparatus and the first wireless communication device; and communicate, with the first wireless communication device, a first communication signal in the spectrum during the TXOP.

In an additional aspect of the disclosure, a non-transitory computer-readable medium having program code recorded thereon, the program code includes code for causing a first wireless communication device to communicate, with a second wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the first wireless communication device and the second wireless communication device; and code for causing the first wireless communication device to communicate, with the second wireless communication device, a first communication signal in the spectrum during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
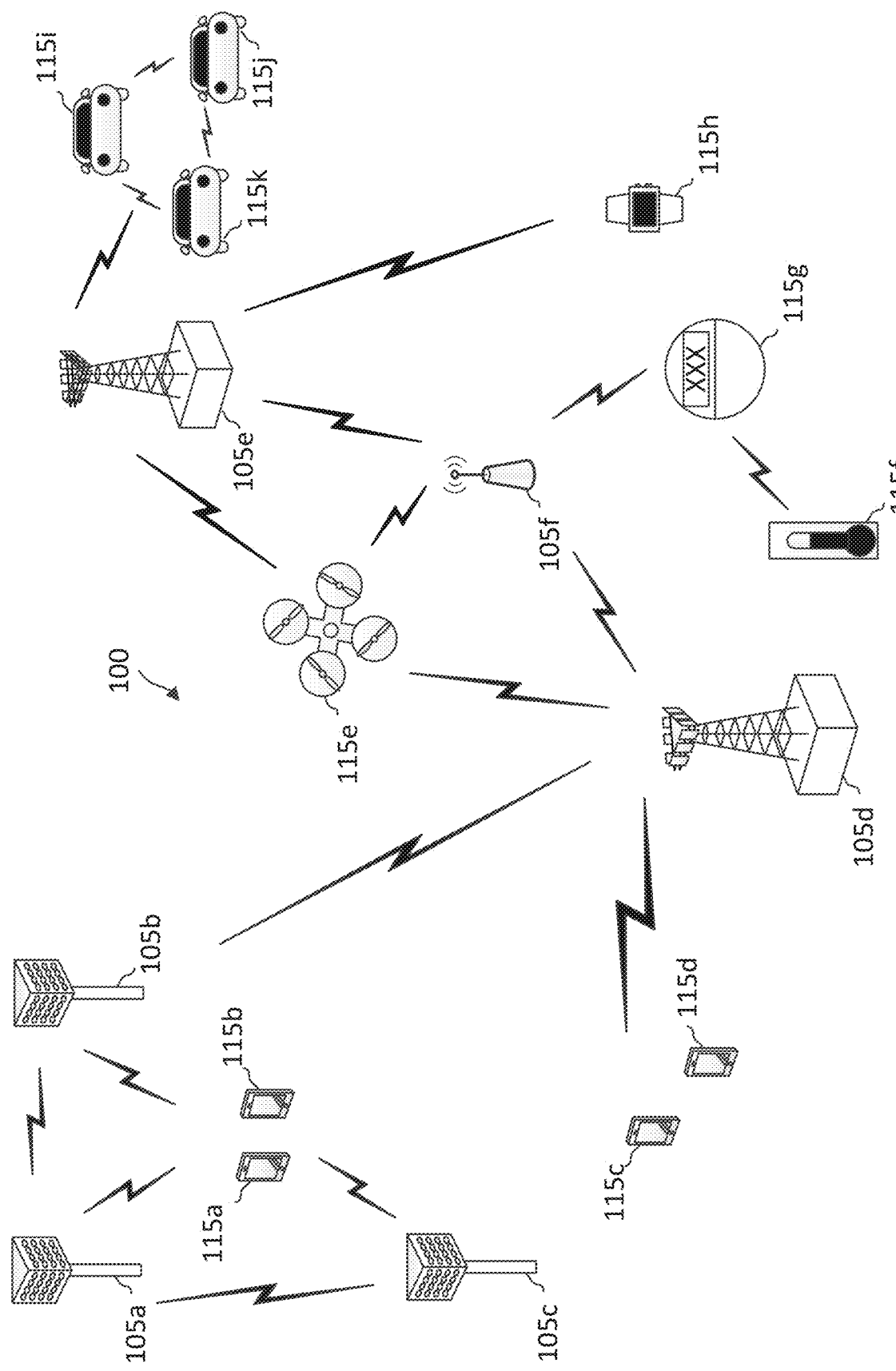
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Frequency reuse is of great importance for cellular and/or wireless communication systems. For example, during network planning, a geographical area may be partitioned into multiple smaller regions or cells. A radio frequency spectrum may be divided into multiple channels. Each cell may be assigned with one of the frequency channels. The same frequency channel may be assigned to multiple cells that are separated sufficiently far apart so that a minimal amount of interference may occur across the cells. In addition, adjacent cells may be assigned with frequency channels that are far apart to reduce interference across the adjacent cells. Thus, with appropriate network planning, frequency reuse can increase network capacity.

In 3G and/or 4G cellular systems, frequency reuse one may be used to further increase network capacity. Frequency reuse one refers to the use of the same frequency channel in each of the adjacent cells. The use of frequency reuse one is enabled by advancements in multi-antenna technologies providing a better trade-off between degrees of freedom (DoF) in a spatial domain than in a time-frequency domain.

In comparison, WiFi is relatively conservative in frequency reuse. For example, WiFi employs listen-before-talk (LBT) procedures for communications over an unlicensed spectrum to ensure that the shared channel is clear before transmitting a signal in the shared channel. Similarly, licensed assisted access (LAA), enhance licensed assisted access (eLAA), and/or future enhanced (LAA) technologies employs LBT procedures for communications over an unlicensed spectrum. For instance, LAA, eLAA, and/or feLAA may use energy detection (ED)-based LBT procedures, where an energy threshold of about −72 decibel-milliwatts (dBm) may be set based on a maximum transmission power of about 23 dBm in a 20 megahertz (MHz) channel. As such, WiFi and LAA/eLAA/feLAA technologies may have relatively low spectral efficiency.

IEEE 802.11ax improves spectral efficiency by introducing basic service set (BSS) and overlapping BSS (OBSS)-based preamble detection (PD). In IEEE 802.11ax, access point (AP) and stations (STAs) are assigned with a numerical BSS identifier, which may also be referred to as a BSS color. An AP or a STA may transmit a preamble signal embedded with a corresponding BSS identifier or a corresponding color in a spectrum to indicate a reservation or intention to transmit in the spectrum. A listening AP or STA may use a more aggressive PD threshold after identifying a OBSS preamble. Based on the PD, the listening AP or STA may determine whether to transmit in the spectrum or yield access. In addition, the IEEE 802.11ax uses two network allocation vector (NAV) values, one for intra-BSS (IBSS) and another one for OBSS. Further, the IEEE 802.11ax may allow for opportunistic reuse of a transmission opportunity (TXOP) in a spatial domain.

The present application describes mechanisms for multiple network operating entities to share a spectrum (e.g., an unlicensed spectrum) for communications. The disclosed embodiments allow for asynchronous contentions or LBTs among the network operating entities. However, the disclosed embodiments apply color coding techniques to enable intra-operator network planning and/or operations. For example, each operator sharing a spectrum is assigned with a color represented by a unique waveform sequence. A reserving node (e.g., a BS or a UE) transmits a reservation signal over-the-air (OTA) to reserve a TXOP by including a waveform sequence that is assigned to an operator of the node in the reservation signal. A monitoring node may monitor the channel (e.g., spectrum) using ED-based LBT. The monitoring node may determine whether a detected reservation signal is transmitted by a node of the same operator or a different operator based on the waveform of the reservation signal. The monitoring node may use different thresholds depending on the reserving operator to determine whether to yield spectrum access to the reserving operator or not. For example, the monitoring node may apply a more stringent or conservative threshold when the reserving node is of a different operator than the monitoring node. In some example, a monitoring may determine to overlay a communication over a reserved TXOP based on the detection and additional information that may be provided by the reservation signal.

In an embodiment, multiple BSs of the same operator may contend for a TXOP in the spectrum and may win the contention. In such an embodiment, the winning BSs may coordinate with each other for communications during the TXOP. For example, the winning BSs may each communicate with a corresponding UE over a link. The winning BSs may perform synchronized rate control to negotiate transmission parameters for communications over the active links.

In an embodiment, each operator may be assigned with multiple sub-colors or sub-waveform sequences to represent different interference tolerance levels. In an embodiment, each operator may be assigned with different colors or waveform sequences for spectrum reservations over different frequency channels or frequency carriers. In an embodiment, each operator may be assigned with different colors or waveform sequences for spectrum reservations over different beam directions or spectral domains.

In an embodiment, at least some operators may cooperate for spectrum sharing. For example, a set of nodes from Operator A may cooperate with a set of nodes from Operator B to form an associative operator set for spectrum reservations, and another set of nodes from Operator A may cooperate with another set of nodes from Operator B to form another associative operator set for spectrum reservations. The associations may be based on geographical locations of the nodes. Each associative operator set may be assigned with a color or a waveform sequence to be included in a reservation signal. When multiple BSs of an associative operator set win a TXOP, the winning BSs may synchronize with each other to perform rate control for communications with corresponding UEs during the TXOP.

Aspects of the present application can provide several benefits. For example, the use of color coding techniques for spectrum sharing among multiple network operating entities can provide a better spectral efficiency and/or a tighter frequency reuse than asynchronous sharing, but without the extensive coordination required for coordinated priority-based sharing. Thus, the color coding techniques can provide a good balance or compromise between spectral efficiency performance and network planning efforts. The association of different operators by geographical locations through network planning can allow for deployments of smaller cells with lower transmission powers (e.g., less interference) and better cooperation, and thus may provide a tighter frequency reuse. The use of OTA waveform sequences for identifications of operators or associative operator sets allow for energy detection-based LBT, which may allow for a lower complexity than the use of numerical color identifies in the IEEE 802.11ax requiring signal decoding. The use of multiple sub-colors to indicate additional reservation information can provide a greater sharing flexibility and/or better decisions on spectrum yielding or TXOP overlays.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) and/or vehicle-to-everything (V2X) between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunity (TXOP) in the shared channel. For example, a BS 105 may perform an LBT in the shared channel. When the LBT passes (the channel is available), the BS 105 may schedule a UE 115 for communications over the shared channel. When the LBT fails (the channel is busy), the BS 105 may backoff and perform another LBT at a later time.

Figure 2:
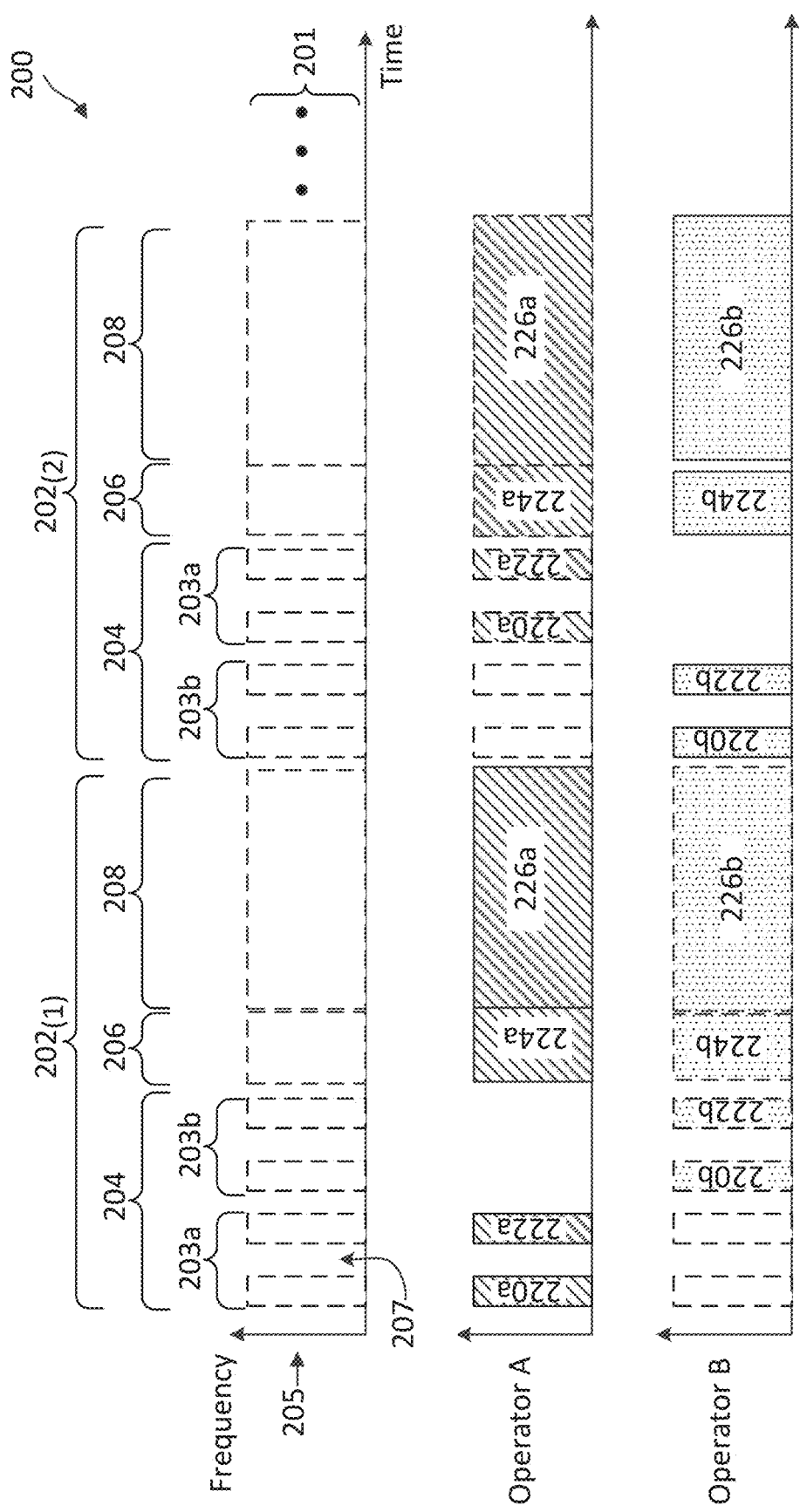
FIG. 2 illustrates a coordinated priority-based spectrum sharing scheme according to embodiments of the present disclosure.

FIG. 2 illustrates a coordinated priority-based spectrum sharing scheme 200 with interference management according to embodiments of the present disclosure. The x-axes represent time in some constant units. The y-axes represent frequency in some constant units. The scheme 200 may be employed by the BSs 105 and the UEs 115 to access a shared spectrum 201. While the scheme 200 illustrates coordinated spectrum access for two different network operating entities (e.g., Operator A and Operator B), the scheme 200 can be applied to any suitable number of network operating entities.

In the scheme 200, the spectrum 201 is time-partitioned into a plurality of time periods 202 as shown in the frame structure 205. The time periods 202 may have a fixed duration and may be defined in units of OFDM symbols, subframes, slots, and/or any suitable time format. Each time period 202 includes a contention period 204 followed by a rate control period 206 and a TXOP 208. Each contention period 204 includes a plurality of channel sensing or clear channel assessment (CCA) periods 203. The timeline or time period structure 205 is predetermined and known by all network operating entities sharing the spectrum 201. The network operating entities may be time-synchronized when operating in the shared spectrum 201.

Each CCA period 203 is assigned to a particular network operating entity (e.g., Operator A or Operator B). The assigned network operating entity may transmit a reservation signal in the CCA period 203 to reserve the following TXOP 208. The CCA periods 203 can be arranged in a decreasing order of priorities. Thus, a low-priority operator node can monitor the channel (e.g., the shared spectrum 201) in the CCA periods 203 of higher priorities. Upon detection of a reservation from a high-priority operator node, the low-priority operator node may refrain from transmitting in the following TXOP 208. The rate control period 206 is used by a winning operator to perform rate controls for communications in the following TXOP 208 as described in greater detail below. The TXOP 208 can include one or more transmission slots, which may be DL-centric slots and/or UL-centric slots.

As an example, Operator A has priority over Operator B in the time period 202(1). As such, the high-priority CCA period 203a is assigned to Operator A and the low-priority CCA period 203b is assigned to Operator B. Thus, in the time period in the time period 202(1), Operator A nodes has prioritized access to the TXOP 208, while Operator B nodes may opportunistically access the TXOP 208 when the TXOP 208 is not reserved by Operator A nodes. The patterned-filled boxes with solid outlines represent signal transmissions based on prioritized access. The patterned-filled boxes with dashed outlines represent signal transmissions based on opportunistic access. The empty-filled dashed boxes represent channel listening.

For prioritized access in the time period 202(1), a BS of Operator A may transmit a reservation request (RRQ) signal 220a during CCA period 203a to reserve the following TXOP 208. The RRQ signal 220a may include a predetermined preamble sequence, a request-to-send (RTS) signal, and/or transmission triggers (e.g., scheduling information) for one or more UEs of Operator A. Each triggered UE may respond by transmitting a reservation response (RRS) signal 222a during the CCA period 203a to silence nearby Operator B nodes (e.g., low priority operator). A gap period 207 between the transmissions of the RRQ signal 220a and the RRS signal 222a allows time for transmit-receive switching. The RRS signal 222a may include a predetermined preamble sequence or a clear-to-send (CTS) signal. Operator B nodes may monitor during the CCA period 203a for an RRQ signal 220a and/or an RRS signal 222a from Operator A. Upon detection of the RRQ signal 220a and/or the RRS signal 222a, Operator B nodes may yield spectrum access to Operator A. Subsequently, the BS may communicate UL and/or DL communication signals 226a with the one or more triggered UEs during the TXOP 208. The communication signals 226a may include UL control information (e.g., scheduling requests, hybrid automatic repeat request (HARQ) acknowledgment/not-acknowledgements (ACK/NACKs), and/or channel quality indicators (CQIs)), DL control information (e.g., scheduling grants), UL data, and/or DL data.

In some instances, multiple BSs of Operator A may contend for the TXOP 208 and may win the TXOP 208. During the rate control period 206, the winning BSs of Operator A may coordinate with each other for communications in the TXOP 208. The coordination may include determining modulation coding schemes (MCSs), transmission power levels, beamforming parameters, transmission ranks or spatial layers for the communications. The coordination may include exchanges of signals 224a among the winning BSs. For example, a BS A1 and a BS A2 won the TXOP 208 for communicating with a UE A1 and a UE A2, respectively. The BS A1 and the BS A2 may negotiate the transmission parameters to be used for the communications with the UE A1 and the UE A2, respectively. In some instances, the negotiations may include multiple iterations.

When the spectrum 201 is not reserved by Operator A, Operator B can opportunistically access the TXOP 208 using similar mechanisms as Operator A. For example, a BS of Operator B may transmit an RRQ signal 220b during the CCA period 203b to trigger one or more UEs of Operator B for communications during the TXOP 208. Each triggered UE may respond by transmitting an RRS signal 222b during the CCA period 203b. Subsequently, the BS may communicate UL and/or DL communication signals 226b similar to the communication signals 226a with the one or more triggered UEs during the TXOP 208. Similarly, when multiple BSs of Operator B opportunistically use the TXOP 208, the multiple BSs may coordinate and negotiate transmission parameters for communicating the communication signals 226b.

In some embodiments, the priorities may be assigned in a round robin manner. For example, in a next time period 202(2), Operator B may have priority over Operator A. Thus, time period 202(2), Operator B nodes have prioritized access in the TXOP 208, while Operator A nodes may opportunistically access the TXOP 208 when the TXOP 208 is not reserved by Operator B nodes. The Operator A nodes and Operator B nodes may employ similar mechanisms as described above to access and communicate over the spectrum 201.

The coordinated priority-based sharing can provide a high performance in terms of spectrum resource utilization efficiency or network capacity. However, the coordinated priority-based sharing may require a substantial effort in network planning and coordination, and thus may not be suitable for some network deployments. For example, asynchronous sharing is typically used in an unlicensed spectrum to allow for coexistence of multiple operators and/or coexistence of multiple radio access technologies (RATs) such as NR and WiFi. In asynchronous sharing, different operator nodes may perform LBTs based on corresponding operator nodes' timelines instead of based on a common time line (e.g., the structure 205). However, asynchronous sharing may have a lower performance in terms of spectral efficiency and/or network capacity than the coordinated priority-based sharing.

Accordingly, the present disclosure provides techniques to improve spectrum sharing efficiency (e.g., spectrum resource utilization efficiency and/or network capacity) in an unlicensed spectrum. The present disclosure utilizes tight frequency reuse color coding techniques for multiple network operating entities to share an unlicensed spectrum for communications.

Figure 3:
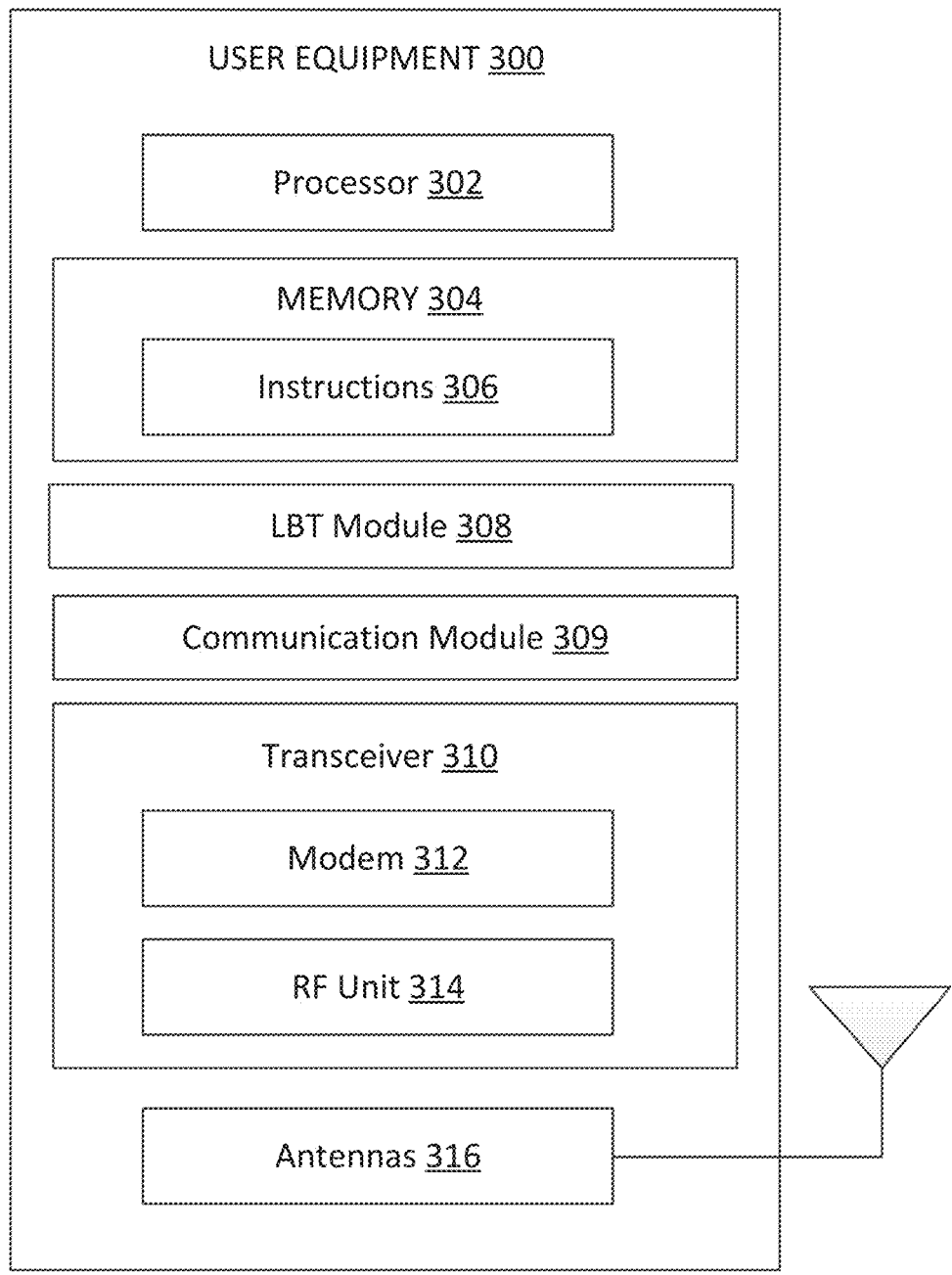
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, an LBT module 308, a communication module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 2 and 5-13. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the LBT module 308 and the communication module 309 may be implemented via hardware, software, or combinations thereof. For example, each of the LBT module 308 and the communication module 309 may be implemented as a processor, circuit, and/or instructions 306 stored in the memory 304 and executed by the processor 302. While FIG. 3 illustrates the LBT module 308 and the communication module 309 as separate modules, in some embodiments, the LBT module 308 and the communication module 309 may be an implemented as an integrated module.

The LBT module 308 may be used for various aspects of the present disclosure, for example, aspects of FIGS. 2 and 5-13. For instance, the LBT module 308 is configured to receive from a BS (e.g., the BSs 105) a configuration indicating a set of one or more reservation waveform sequences identifying a network operating entity associated with the UE 300, perform LBTs based on the configuration, configure energy thresholds for reservation signal detection, and/or indicate LBT results to the communication module 309. In some examples, the set of waveforms may include different waveforms representing different interference tolerance levels. In some examples, the network operating entity corresponds to a network operator that operates the UE 300. In some other examples, the network operating entity corresponds to an associative set of network operators agreeing to cooperate or coordinate for spectrum sharing. The association of network operators for spectrum sharing and the waveform sequence-based identifications are referred to as color coding and can allow for a tight frequency reuse as described in greater detail herein.

In an example, the LBT module 308 is configured to monitor for a reservation signal (e.g., the RRQ signals 220 and/or RRS signals 222) reserving a TXOP (e.g., the TXOPs 208) in an unlicensed spectrum (e.g., the spectrum 201) and determine whether the reservation signal is from the same network operating entity as the UE 300 or from a different network operating entity based on the waveform of the reservation signal, determine an energy detection threshold based on whether the reservation signal is from the same network operating entity as the UE 300 or from a different network operating entity and/or based on an interference tolerance level indicated by the waveform sequence, determine whether to yield spectrum access or overlay a communication over the TXOP (e.g., in a spatial domain and/or with transmission adjustments) based on a comparison of the detected signal energy to the energy detection threshold.

In an example, the LBT module 308 is configured to transmit a reservation signal (e.g., the RRQ signals 220 and/or the RRS signals 222) to reserve a TXOP in the spectrum. The reservation signal includes a waveform sequence indicated by the configuration. The LBT module 308 may select a waveform sequence according to an interference tolerance level of the UE 300 for the reserved TXOP.

The communication module 309 may be used for various aspects of the present disclosure. For example, the communication module 309 is configured to receive UL and/or DL scheduling grants from a BS, communicate UL and/or DL communications with the BS based on the scheduling grant and LBT results indicated by the LBT module 308. Mechanisms for communicating over an unlicensed spectrum with OTA waveform sequenced-based reservations and tight frequency reuse color coding are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the communication module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
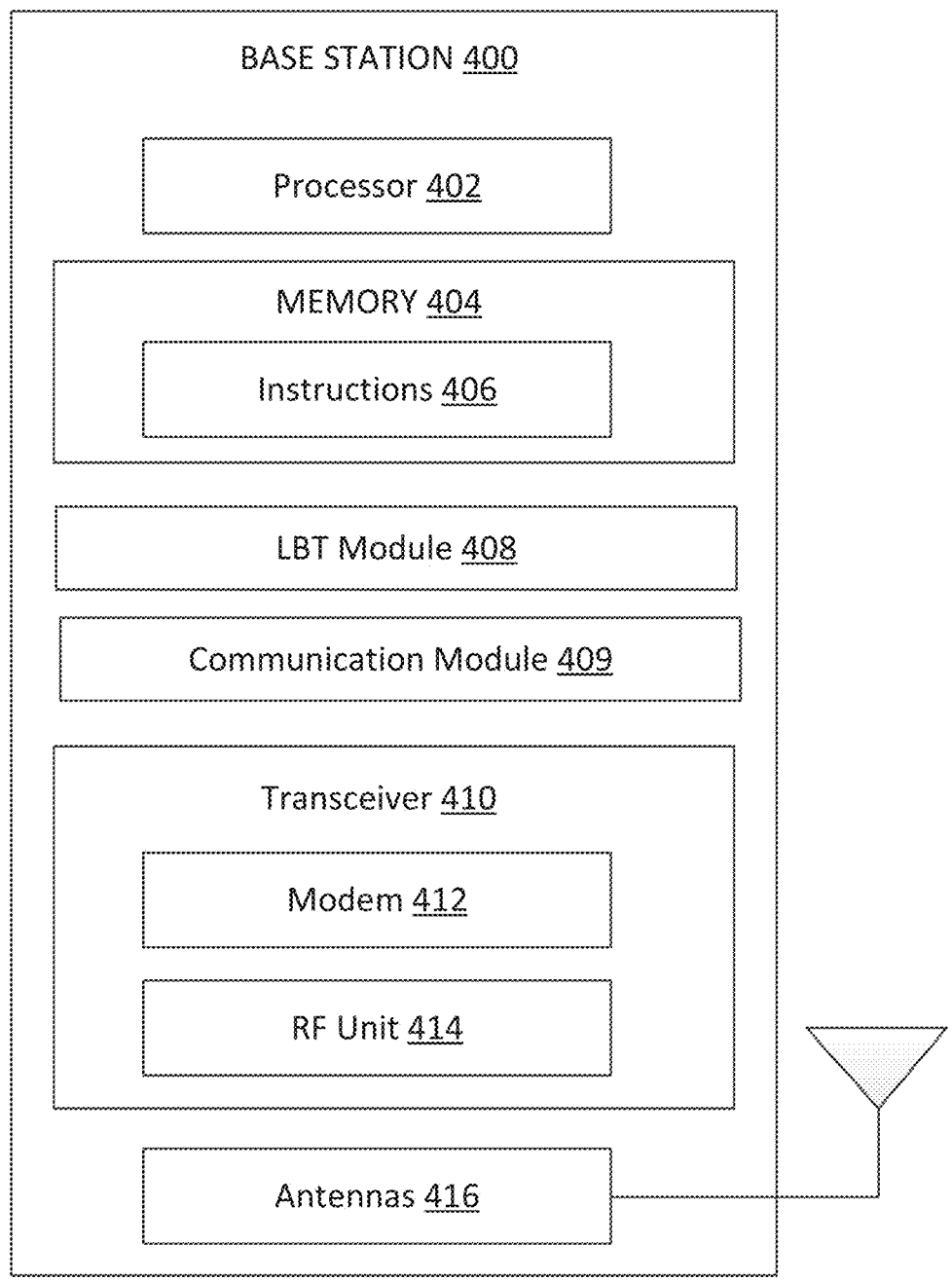
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 as discussed above in FIG. 1. A shown, the BS 400 may include a processor 402, a memory 404, an LBT module 408, a communication module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2 and 5-13. Instructions 406 may also be referred to as code, which may be interpreted broadly to include any type of computer-readable statement(s) as discussed above with respect to FIG. 3.

Each of the LBT module 408 and the communication module 409 may be implemented via hardware, software, or combinations thereof. For example, each of the LBT module 408 and the communication module 409 may be implemented as a processor, circuit, and/or instructions 406 stored in the memory 404 and executed by the processor 402. While FIG. 4 illustrates the LBT module 408 and the communication module 409 as separate modules, in some embodiments, the LBT module 408 and the communication module 409 may be an implemented as an integrated module.

The LBT module 408 may be used for various aspects of the present disclosure, for example, aspects of FIGS. 2 and 5-13. The LBT module 408 is configured with a set of one or more reservation waveform sequences identifying a network operating entity associated with the BS 400. The LBT module 408 is configured to perform LBTs based on the configuration, configure energy thresholds for reservation detection, and/or indicate LBT results to the communication module 409. In some examples, the set of waveforms may include different waveforms representing different interference tolerance levels. In some examples, the network operating entity corresponds to a network operator that operates the BS 400. In some examples, the network operating entity corresponds to an associative set of network operators agreeing to cooperate or coordinate for spectrum sharing. The association of network operators for spectrum sharing and the waveform sequence-based identifications are referred to as color coding and can allow for a tight frequency reuse as described in greater detail herein.

In an example, the LBT module 408 is configured to monitor for a reservation signal (e.g., the RRQ signals 220 and/or RRS signals 222) reserving a TXOP (e.g., the TXOPs 208) in an unlicensed spectrum (e.g., the spectrum 201), determine whether the reservation signal is from the same network operating entity as the BS 400 or from a different network operating entity based on the waveform sequence of the reservation signal, determine an energy threshold based on whether the reservation signal is from the same network operating entity as the BS 400 or from a different network operating entity and/or based on an interference tolerance level indicated by the waveform sequence, determine whether to yield spectrum access or overlay a communication over the TXOP (e.g., in a spatial domain and/or with transmission adjustments) based on a comparison of the detected signal energy to the energy threshold.

In an example, the LBT module 408 is configured to transmit a reservation signal (e.g., the RRQ signals 220 and/or the RRS signals 222) to reserve a TXOP in the spectrum. The reservation signal includes a waveform sequence indicated by the configuration. The LBT module 408 may select a waveform sequence according to an interference tolerance level of the BS 400 for the reserved TXOP.

The communication module 409 may be used for various aspects of the present disclosure. For example, the communication module 409 is configured to transmit the waveform configuration to a UE (e.g., the UEs 115 and 300), determine UL and/or DL communication schedules, transmit scheduling grants to a UE, coordinate with other BSs of the same network operating entity or different network operating entities, and/or communicate UL and/or DL communications with the UE based on the scheduling grant and LBT results indicated by the LBT module 408. The coordination may include performing rate control, which may include determinations of MCSs, transmission power levels, transmission ranks, and/or beamforming parameters among BSs sharing the same TXOP. Mechanisms for communicating over an unlicensed spectrum with OTA waveform sequenced-based reservations and tight frequency reuse color coding are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 400. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 400 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
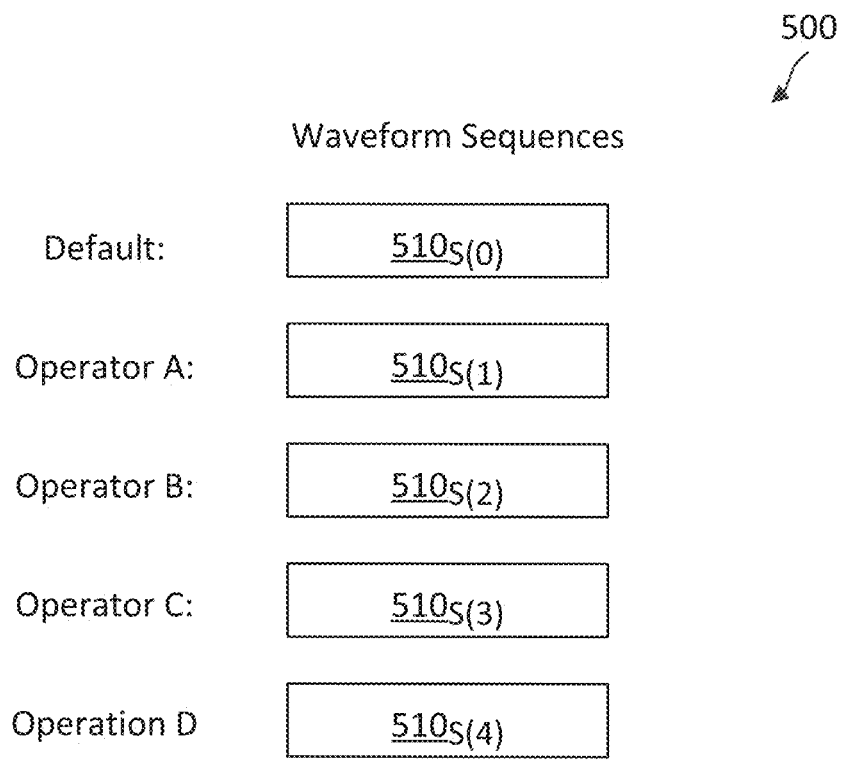
FIG. 5 illustrates a color-coded listen-before-talk (LBT) configuration scheme according to some embodiments of the present disclosure.

FIG. 5 illustrates a color-coded LBT configuration scheme 500 according to some embodiments of the present disclosure. The scheme 500 may be employed by BSs such as the BSs 105 and 400 and UEs such as the UEs 115 and 300 in a network such as the network 100. FIG. 5 illustrates four operators (e.g., Operator A, Operator B, Operator C, and Operator D) sharing a spectrum (e.g., the spectrum 201) for communications for purposes of simplicity of discussion, though it will be recognized that embodiments of the present disclosure may be applied to less operators (e.g., about 2 or 3) or more operators (e.g., about 5, 6, or more).

The scheme 500 includes a set of waveform sequences 510 for OTA spectrum reservations. Each waveform sequence 510 is a physical waveform signal having a unique waveform shape. Accordingly, each waveform sequence 510 in the set includes a different physical waveform shape. In other words, each The waveform sequences 510 are shown as $510_{S(0)}$, $510_{S(1)}$, $510_{S(2)}$, $510_{S(3)}$, and $510_{S(4)}$. Each network operating entity is assigned with a waveform sequence 510. For example, the waveform sequence $510_{S(1)}$ is assigned to Operator A, the waveform sequence $510_{S(2)}$ is assigned to Operator B, the waveform sequence $510_{S(3)}$ is assigned to Operator C, and the waveform sequence $510_{S(4)}$ is assigned to Operator D. The scheme 500 may assign the waveform sequence $510_{S(0)}$ as a default (e.g., an unknown or unspecified network operator). The assignments of the waveform sequences 510 to the operators may be referred to as color coding. In other words, each waveform sequence 510 represents a color and different operators are assigned with different colors for spectrum sharing.

In the scheme 500, Operator A nodes, Operator B nodes, Operator C nodes, and Operator D nodes employ LBTs to avoid collisions. During an LBT, each operator node (e.g., the BSs 105 and 400 and the UEs 115 and 300) may monitor the spectrum for a reservation from another node. When the channel or spectrum is clear, the node may transmit a reservation signal (e.g., the RRQ signals 220 and the RRS signals 222) to reserve a TXOP in the spectrum. When the node is an Operator A node, the node may transmit a reservation signal including the waveform sequence $510_{S(1)}$. When the node is an Operator B node, the node may transmit a reservation signal including the waveform sequence $510_{S(2)}$. When the node is an Operator C node, the node may transmit a reservation signal including the waveform sequence $510_{S(3)}$. When the node is an Operator D node, the node may transmit a reservation signal including the waveform sequence $510_{S(4)}$. When the node has not received a waveform assignment, the node may transmit a reservation signal including the default waveform sequence $510_{S(0)}$.

In an embodiment, a monitoring node may determine the presence of a reservation signal based on energy detection. For example, the monitoring node may determine the presence of a reservation signal by comparing a signal energy detected from the spectrum to a predetermined threshold. The monitoring node may determine whether the LBT is a pass or a failure based on the comparison. For example, when the detected energy is below the predetermined threshold, the LBT is a pass. Conversely, when the detected energy exceeds the predetermined threshold, the LBT is a fail. When the monitoring node fails an LBT, the monitoring node may backoff for a certain period of time and retry LBT again.

In an embodiment, a monitoring node may identify the operator of the reserving node based on the waveform of the detected reservation signal. The monitoring node may compute an autocorrelation and/or a cross-correlation between the detected reservation signal and the waveform sequence 510 assigned to the monitoring node. The monitoring node may determine whether a detected reservation signal is transmitted by a node of the same operator or a node of another operator based on the computed autocorrelation or cross-correlation.

In an embodiment, the monitoring node may use a different energy threshold depending on whether the reserving node belongs to the same operator or a different operator. For example, when the reserving node is of the same operator or color, but not the default network operator, the monitoring node may use a threshold of about −52 dBm. When the reserving node is of a different operator or color, the monitoring node may use a more conservative threshold of about −72 dBm. In general, the monitoring node may use a more relaxed energy threshold for identifying whether a reservation needs to be respected or honored when the reservation is from a node of the same operator.

In an embodiment, multiple BSs of the same operator may win a TXOP. The winning BSs may coordinate with each other to determine transmission parameters for communications during the TXOP. For example, after winning the TXOP, the winning BSs may perform rate control during a rate control period similar to the rate control period 206. The rate control period may be synchronized to a common timeline (e.g., at a 1 millisecond (ms) boundary). The coordination or rate control may include determining MCSs, transmission power levels, beamforming parameters, transmission ranks or spatial layers for the communications during the TXOP so that interference across the active links between the winning BSs and corresponding UEs may be minimal. For example, a BS A1 and a BS A2 of Operator A won a TXOP for communicating with a UE A1 and a UE A2, respectively. The BS A1 and the BS A2 may negotiate the transmission parameters to be used for the communications with the UE A1 and the UE A2, respectively. In some instances, the negotiations may include multiple iterations.

Accordingly, while the scheme 500 utilizes asynchronous LBTs for contentions, the scheme 500 allows for intra-color or intra-operator coordination. As such, the scheme 500 can provide improved spectrum resource utilization and/or spectrum sharing efficiency.

Figure 6:
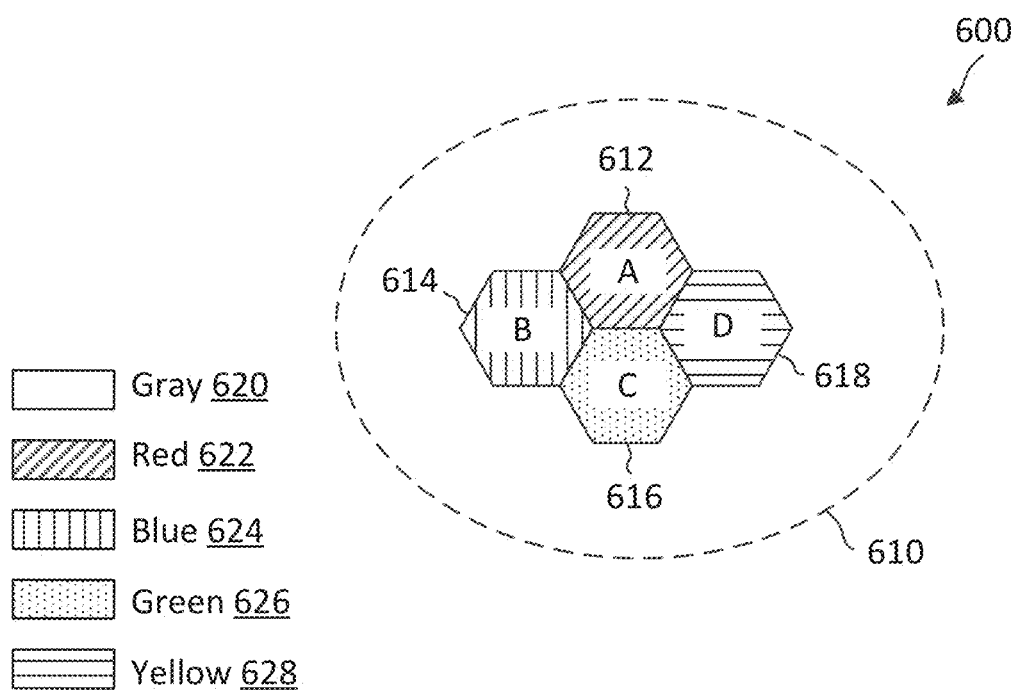
FIG. 6 illustrates a color-coded network configuration scheme according to some embodiments of the present disclosure.

FIG. 6 illustrates a color-coded network configuration scheme 600 according to some embodiments of the present disclosure. The scheme 600 may be employed by a network such as the network 100 during network planning. For example, nodes in a geographical area 610 may communicate over an unlicensed spectrum (e.g., the spectrum 201) using the scheme 500. The area 610 may be partitioned into regions 612, 614, 616, and 618. Operator A nodes (e.g., including BSs such as 105 and 400 and UEs such as the UEs 115 and 300) may be positioned in the region 612, Operator B nodes (e.g., including BSs and UEs) may be positioned in the region 614, Operator C nodes (e.g., including BSs and UEs) may be positioned in the region 616, and Operator D nodes (e.g., including BSs and UEs) may be positioned in the region 618. While FIG. 6 illustrates four regions 612, 614, 616, and 618 in the area 610 each having a hexagonal shape, the area 610 may include more regions (e.g., about 5, 6, 7, 8 or more) where Operator A nodes, Operator B nodes, Operator C nodes, and/or Operator D nodes may be positioned and the regions 612, 614, 616, and 618 can be in any suitable shape.

In the scheme 600, all nodes from Operator A are assigned with a color 622 represented by waveform sequence $510_{S(1)}$. All nodes from Operator B are assigned with a color 624 represented by the waveform sequence $510_{S(2)}$. All nodes from Operator C are assigned with a color 626 corresponding to the waveform sequence $510_{S(3)}$. All nodes from Operator D are assigned with a color 628 represented by the waveform sequence $510_{S(4)}$. Prior to any color or waveform assignment, a node may begin with a default color 620 corresponding to the waveform sequence $510_{S(0)}$. The colors 620, 622, 624, 626, and 628 may be any suitable color palette. In some examples, the colors 620, 622, 624, 626, and 628 can be gray, red, blue, green, and yellow, respectively.

In an embodiment, the scheme 600 may employ small-cell deployments to allow for BSs and UEs to utilize a relatively low transmission power for communications such that interference may be minimal. For example, a UE of a certain operator may be configured to communicate with a BS of the certain operator that is located at a closest proximity to the UE, and thus the BS and the UE may communicate using a relatively lower transmission power than when the UE communicates with a farther away BS.

Figure 7:
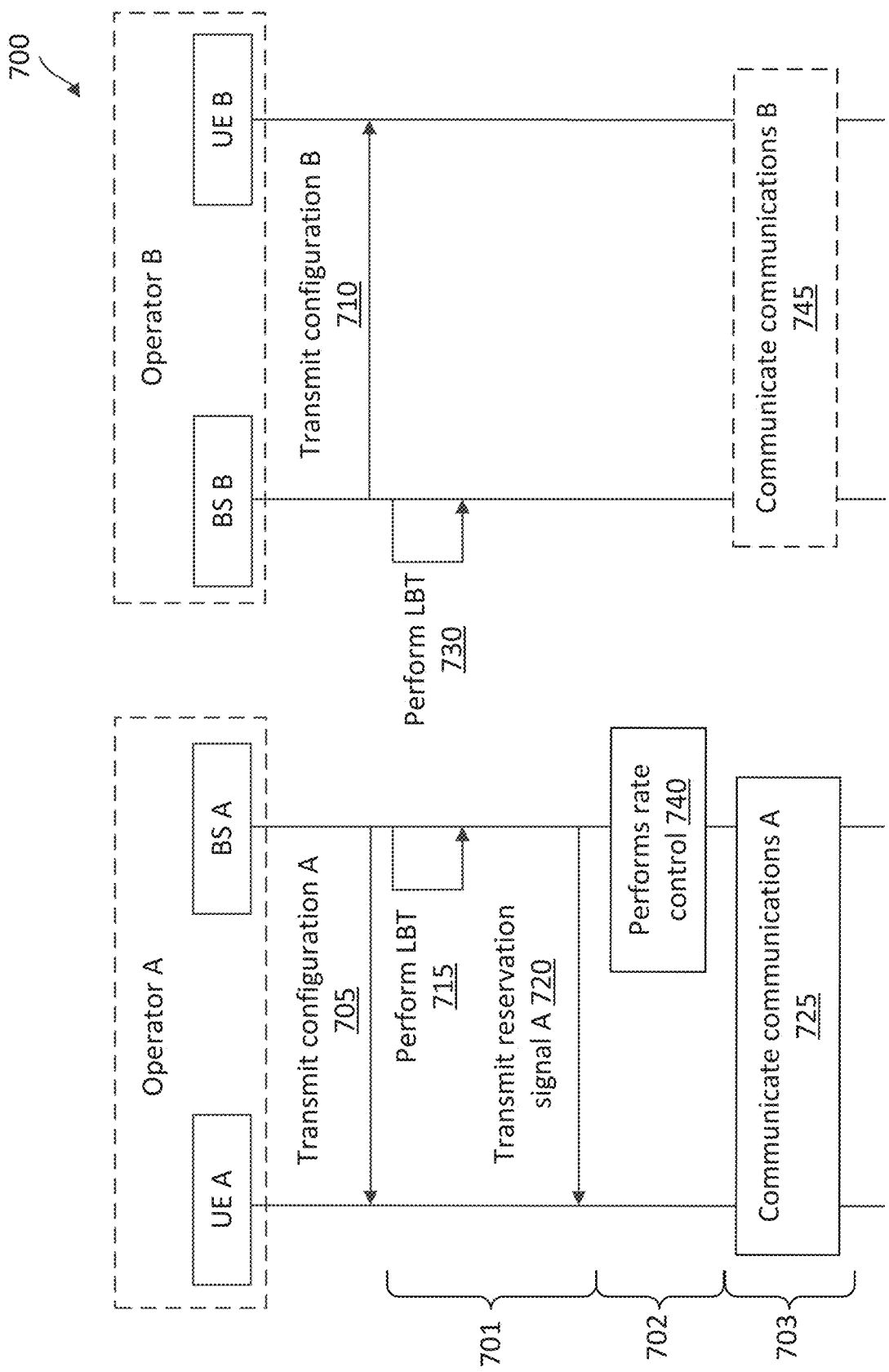
FIG. 7 is a signaling diagram illustrating a communication method implementing color-coded LBTs according to some embodiments of the present disclosure.

FIG. 7 is a signaling diagram illustrating a communication method 700 implementing color-coded LBTs according to some embodiments of the present disclosure. The method 700 is implemented by a BS A serving a UE A and a BS B serving a UE B in a network over an unlicensed spectrum (e.g., the spectrum 201). The BS A and the BS B are similar to the BSs 105 and 400. The UE A and the UE B are similar to the UEs 115 and 300. The network is similar to the network 100. The BS A and the UE A are associated with Operator A. The BS B and the UE B are associated with Operator B. For example, the BS A and the UE A may be located in the area or region 612, and the BS B and the UE B may be located in the region 614. The method 700 may use similar mechanisms as in the schemes 500 and 600 described above with respect to FIGS. 5 and 6, respectively. Steps of the method 700 can be executed by computing devices (e.g., a processor, processing circuit, and/or other suitable component) of the BS A, BS B, UE A, and UE B. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 705, the BS A transmits a configuration A to the UE A. The configuration A includes a waveform assignment for spectrum reservations. For example, the waveform assignment may indicate the waveform sequence $510_{S(1)}$. The BS A may receive the assignment of the waveform sequence $510_{S(1)}$ from a central control entity (e.g., a spectrum access system (SAS)).

At step 715, the BS A performs an LBT in the spectrum, for example, during a contention period 701. The contention period 701 is for asynchronous LBTs, where each node may perform an LBT based on the node's own timeline. The LBT may be an energy detection-based LBT. The BS A may determine whether the channel is available by comparing a detected signal energy to a predetermine threshold. The BS A may use different thresholds for a reservation from the same operator A and for a reservation from a different Operator B. For example, the BS A determines that the channel is clear based on the LBT.

At step 720, the BS A transmits a reservation signal A (e.g., the RRQ signals 220) to reserve a TXOP 703 for communications with the UE A. The reservation signal A includes the waveform sequence $510_{S(1)}$ identifying Operator A.

At step 725, the BS A communicates communications A (e.g., the communication signals 226a) with the UE A during the TXOP 703.

Similarly, at step 710, the BS B transmits a configuration B to the UE B. The configuration B includes a waveform assignment for spectrum reservations. For example, the waveform assignment may indicate the waveform sequence $510_{S(2)}$. The BS B may receive the assignment of the waveform sequence $510_{S(2)}$ from the central control entity.

At step 730, the BS B performs an LBT during the contention period 701. Similarly, the BS B uses an energy detection-based LBT. The BS B may detect the reservation signal A and may determine that the reservation signal A is from a different operator than the Operator B based on a cross correlation between the detected reservation signal A and the waveform sequence $510_{S(2)}$ assigned to Operator B. The BS B may apply a detection threshold (e.g., of about −72 dBm) based on the determination that the reservation signal A is from a different operator.

In an example, upon detecting the reservation signal A, the BS B may refrain from communicating with the UE B.

In another example, the reservation signal A may provide other information related to the reservation, such as interference tolerance levels and/or durations of the reservation or the TXOP 703, to allow for a communication overlay in the TXOP 703. Thus, at step 745, instead of yielding access to Operator A, the BS B may proceed to communicate communications B (e.g., the communication signals 226b) with the UE B during the TXOP 703. However, the BS B may adjust transmission parameters (e.g., MCSs, transmission power level, beamforming parameters, transmission ranks) based on the information provided by the reservation signal A for overlaying the communications B over the communications A during the TXOP 703. When the BS B overlays the communications B over the communications A, the BS B may schedule the UE B such that the communications B is completed before the end of the TXOP 703, for example, based on the TXOP duration indicated by the reservation signal A. In some embodiments, multiple overlays of a TXOP may be allowed. In such embodiments, a scheduling BS is responsible for ensuring that an overlaying TXOP terminates before the earliest end time of one or more overlaid TXOPs.

In an embodiment, the multiple BSs of Operator A may contend for the TXOP 703 in the spectrum and may win the contention. In such an embodiment, the BS A may perform rate control with the other winning BSs during a rate control period 702 (e.g., the rate control period 206) to determine transmission parameters (e.g., MCSs, transmission power levels, beamforming parameters, and/or transmission ranks) for communications during the TXOP 703 as shown by the step 740.

Figure 8:
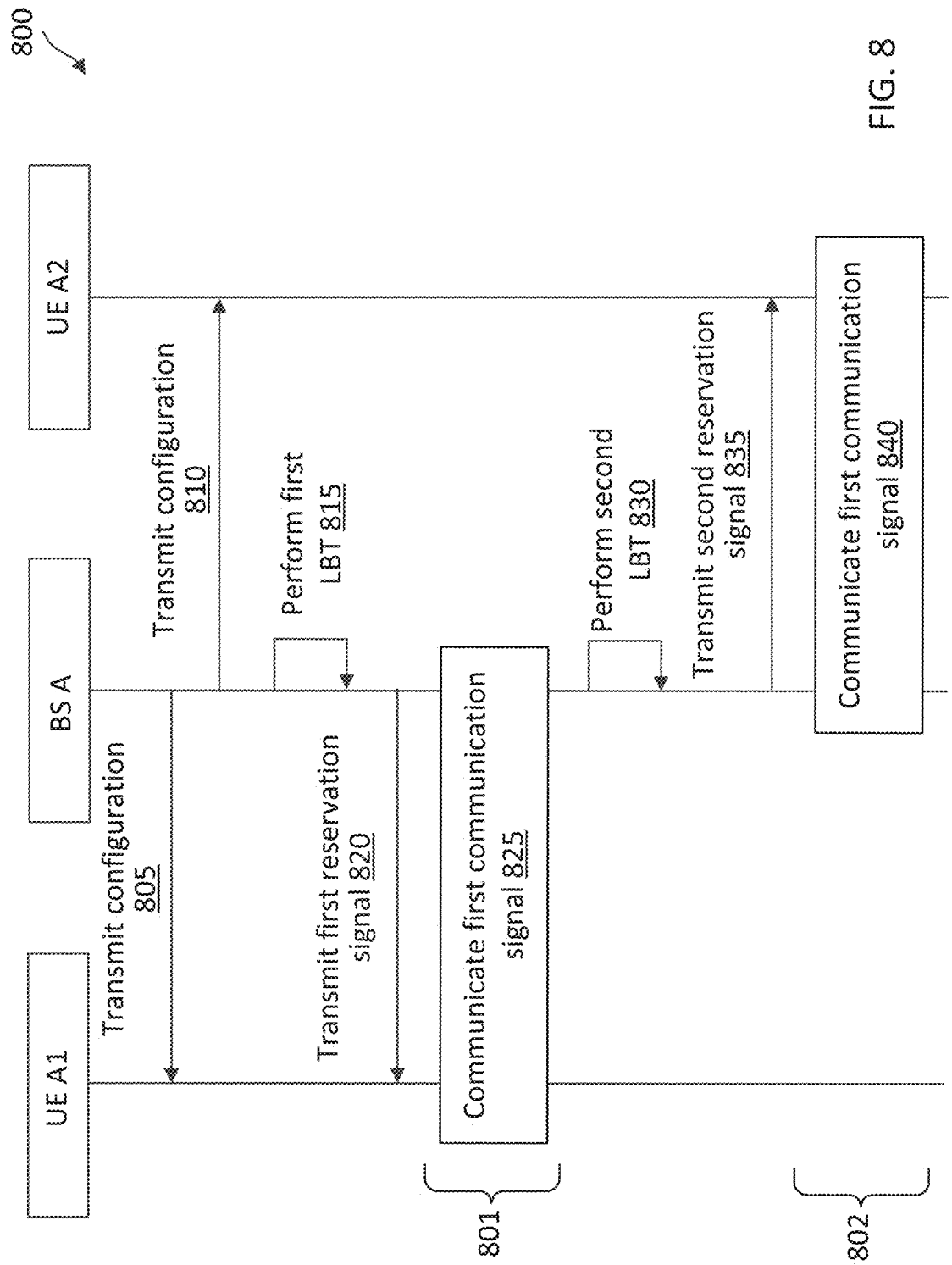
FIG. 8 is a signaling diagram illustrating a communication method implementing color-coded LBTs according to some embodiments of the present disclosure.

FIG. 8 is a signaling diagram illustrating a communication method 800 implementing color-coded LBTs according to some embodiments of the present disclosure. The method 800 is implemented by a BS A serving a UE A1 and a UE A2 in a network over an unlicensed spectrum (e.g., the spectrum 201). The BS A is similar to the BSs 105 and 400. The UE A1 and the UE A2 are similar to the UEs 115 and 300. The network is similar to the network 100. The BS A, the UE A1, and the UE A2 are associated with Operator A. Operator A may share the spectrum for communications with Operator B. For example, the BS A, the UE A1, and the UE A2 may be located in the area 612, and the Operator B may operate nodes located in the region 614. The method 800 may use similar mechanisms as in the schemes 500 and 600 and the method 700 described above with respect to FIGS. 5, 6, and 7, respectively. Steps of the method 800 can be executed by computing devices (e.g., a processor, processing circuit, and/or other suitable component) of the BS A, UE A1, and UE A2. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 is substantially similar to the method 700 and illustrates a scenario where a BS falls back to a default color for communications with a certain UE. The method 800 can be used in conjunction with the method 700.

At step 805, the BS A transmit a first configuration to the UE A1. The first configuration includes an assignment of the waveform sequence $510_{S(1)}$ identifying Operator A. The configuration may further include an indication of the default waveform sequence $510_{S(0)}$, which may be used for certain communications.

At step 810, the BS A transmits a second configuration to the UE A2. In some embodiments, the transmissions of the configurations to the UE A1 and the UE A2 may be a single transmission.

At step 815, the BS A performs a first LBT (e.g., an energy detection-based LBT). For example, the first LBT is a pass.

At step 820, the BS A transmits a first reservation signal (e.g., the RRQ signals 220) to reserve a first TXOP 801 (e.g., the TXOP 703) in the spectrum. The first reservation signal includes the waveform sequence $510_{S(1)}$.

At step 825, the BS A communicates a first communication signal (e.g., the communication signals 226) with the UE A1 during the first TXOP 801.

At step 830, the BS A performs a second LBT (e.g., an energy detection-based LBT). For example, the second LBT is a pass.

At step 835, the BS A transmit a second reservation signal to reserve a second TXOP 802 (e.g., the TXOPs 703 and 801). The BS A may determine that a communication with the UE A2 may require a higher transmission power level. Thus, the BS A may temporarily fallback to use the default color when transmitting the second reservation signal (e.g., including the waveform sequence $510_{S(0)}$). In other words, the BS A may temporarily disable the tight frequency reuse provided by the color coding.

At step 840, the BS A communicates a first communication signal with the UE A2 (e.g., the communication signals 226) during the first TXOP 802.

Subsequently, the BS A may return to use the waveform sequence $510_{S(1)}$ for a next reservation.

While the method 800 illustrates a temporary disable of the tight-frequency reuse by using the default waveform sequence $510_{S(0)}$, the BS A may use the default waveform sequence $510_{S(0)}$ for communications with the UE A2 in a longer-term when the UE A2 is a high-mobility UE.

Figure 9:
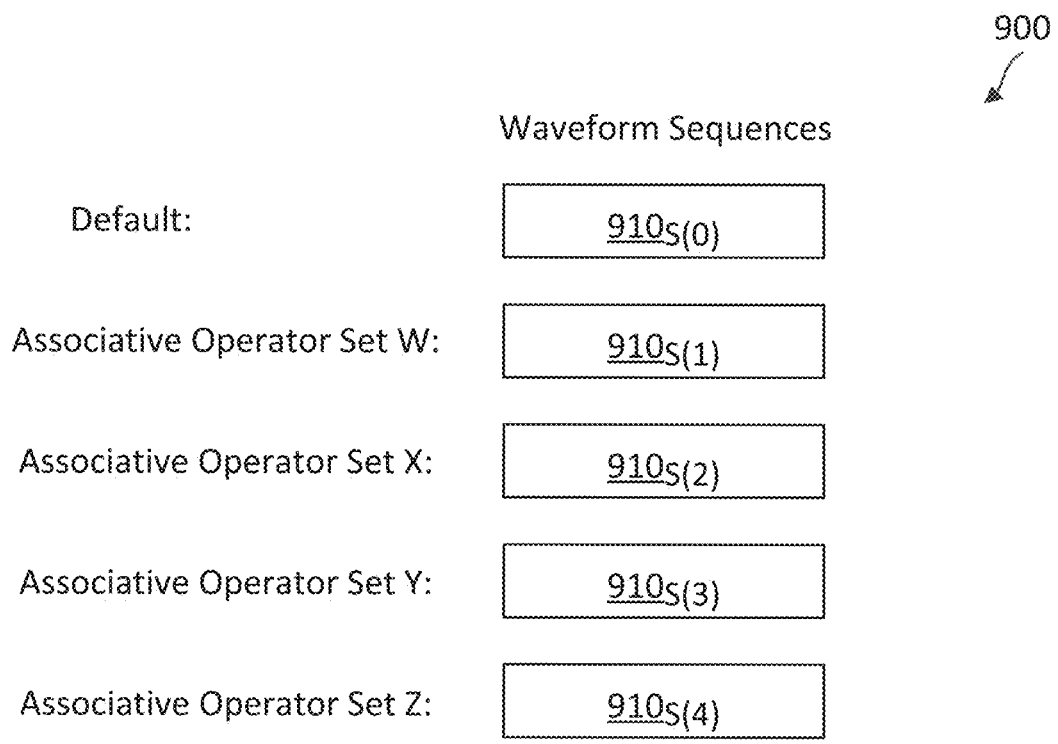
FIG. 9 illustrates a color-coded LBT configuration scheme according to some embodiments of the present disclosure.

FIG. 9 illustrates a color-coded LBT configuration scheme 900 according to some embodiments of the present disclosure. The scheme 900 may be employed by BSs such as the BSs 105 and 400 and UEs such as the UEs 115 and 300 in a network such as the network 100. The scheme 900 is substantially similar to the scheme 900. However, the scheme 900 allows for cooperation across at least some operators through network planning. FIG. 9 illustrates four associative operator set (e.g., W, X, Y, and Z) sharing a spectrum (e.g., the spectrum 201) for communications for purposes of simplicity of discussion, though it will be recognized that embodiments of the present disclosure may be applied to a less number of associative operator sets (e.g., about 2 or 3) or a greater number of associative operator sets (e.g., about 5, 6, or more).

Similar to the scheme 500, the scheme 900 includes a set of waveform sequences 910 for OTA spectrum reservations. The waveform sequences 910 may be similar to the waveform sequences 510. Each waveform sequence 910 may include a unique waveform shape. The waveform sequences 910 are shown as $910_{S(0)}$, $910_{S(1)}$, $910_{S(2)}$, $910_{S(3)}$, and $910_{S(4)}$. One or more network operators may cooperate to form an associative operator set based on certain association rules. For example, the associative operator set W may include a first set of Operator A nodes and a first set of Operator B nodes, while the associative operator set X may include a second, different set of Operator A nodes and a second, different set of Operator B nodes. The association may be determined based on the first set of Operator A nodes geographically positioned close to the second set of Operator A nodes and/or based on the first set of Operator B nodes geographically positioned close to the second set of Operator B nodes. In general, each associative operator set may include any suitable combinations of Operator nodes based on network planning.

Each associative operator set is assigned with a waveform sequence 910. For example, the waveform sequence $910_{S(1)}$ is assigned to the associative operator set W, the waveform sequence $910_{S(2)}$ is assigned to the associative operator set X, the waveform sequence $910_{S(3)}$ is assigned to the associative operator set Y, and the waveform sequence $910_{S(4)}$ is assigned to the associative operator set Z. The scheme 900 may assign the waveform sequence $910_{S(0)}$ as a default (e.g., an unknown or unspecified network operator). Thus, the scheme 900 assigns colors based on associations rather than based on operators.

During an LBT, each node (e.g., the BSs 105 and 400 and the UEs 115 and 300) may monitor the spectrum for a reservation from another node. When the channel or spectrum is clear, the node may transmit a reservation signal (e.g., the RRQ signals 220 and the RRS signals 222) to reserve a TXOP in the spectrum. When the node is associated with the associative operator set W, the node may transmit a reservation signal including the waveform sequence $910_{S(1)}$. When the is associated with the associative operator set X, the node may transmit a reservation signal including the waveform sequence $910_{S(2)}$. When the node is associated with the associative operator set Y, the node may transmit a reservation signal including the waveform sequence $910_{S(3)}$. When the node is associated with the associative operator set Z, the node may transmit a reservation signal including the waveform sequence $910_{S(4)}$. When the node has not received a waveform assignment, the node may transmit a reservation signal including the default waveform sequence $910_{S(0)}$.

In the scheme 900, a monitoring node may use substantially similar mechanisms as in the scheme 500. For example, a monitoring node may use an energy detection-based LBT. The monitoring node may set an energy detection threshold depending on whether a reservation signal is transmitted by the same associative operator set or a different associative operator set. The monitoring node may use a more conservative threshold for a reservation from another associative operator set. Upon multiple BSs from an associative operator set winning a TXOP (e.g., the TXOPs 703, 801, and 802), the winning BSs may coordinate with each other to perform rate control for communication during the TXOP irrespective of operators of the BSs.

For example, the associative set W includes a BS A, a UE A, a BS B, and a UE B based on an association rule determined during network planning. When the BS A and the BS B won a TXOP, the BS A and the BS B may cooperatively perform rate control to determine transmission parameters for communications with the UE A and the UE B, respectively during the TXOP. The BS A and the BS B may synchronize to a rate control period (e.g., the rate control periods 206 and 702) for rate control negotiations.

As can be observed, the scheme 900 associates operator nodes based on geographical locations during network planning and applies color coding at an associative operator set-level instead of at an operator-level. In addition, the scheme 900 allows for intra-color coordination instead of limiting the coordination to be intra-operator as in the scheme 500. Accordingly, the scheme 900 can provide a higher spectrum resource utilization efficiency and a tighter frequency reuse compared to the scheme 500.

Figure 10:
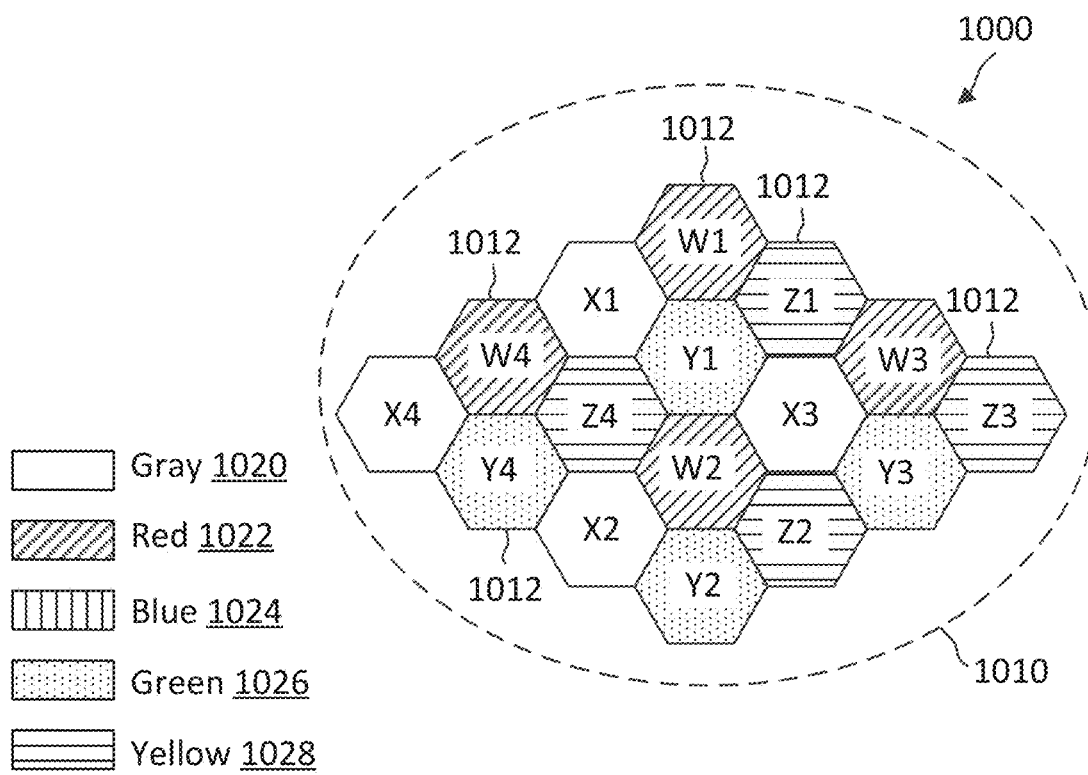
FIG. 10 illustrates a color-coded network configuration scheme according to some embodiments of the present disclosure.

FIG. 10 illustrates a color-coded network configuration scheme 1000 according to some embodiments of the present disclosure. The scheme 1000 may be employed by a network such as the network 100 during network planning. For example, nodes in a geographical area 1010 (e.g., the area 610) may communicate over an unlicensed spectrum (e.g., the spectrum 201) using the method 800. The area 1010 may be partitioned into multiple smaller regions 1012. All nodes within a particular region 1012 may be assigned with a color for spectrum reservations. The scheme 1000 assigns color for spectrum reservations based on geographical partitions and operator associations instead of based on operators as in the scheme 600.

For example, all nodes located in a region W1 1012 are associated with the associative operator set W and are assigned with a color 1022 represented by the waveform sequence $910_{S(1)}$. Thus, when a node located within the region W1 1012 transmits a reservation signal, the reservation signal may configured to include the waveform sequence $910_{S(1)}$. In addition, the same color assignment may be reused for one or more regions 1012 that are spaced apart from each other by a certain distance to minimize interference. For example, nodes located in regions W1, W2, W3, and W4 1012 are assigned with the same color 1022, where the regions W1, W2, W3, and W4 1012 are spaced apart from each by at least one region of another color such that interference across the regions W1, W2, W3, and W4 1012 may be minimal.

Similarly, all nodes in the regions X1, X2, X3, and X4 1012 form the associative operator set X and are assigned with the same color 1024 represented by the waveform sequence 910(2). All nodes in the regions Y1, Y2, Y3, and Y4 1012 form the associative operator set Y and are assigned with the same color 1026 represented by the waveform sequence 910(3). All nodes in the regions Z1, Z2, Z3, and Z4 1012 form the associative operator set Z and are assigned with the same color 1028 represented by the waveform sequence 910(4). Similar to the scheme 600, prior to any color or waveform assignment or association, a node may begin with a default color 1020 represented by the waveform sequence $910_{S(0)}$. The colors 1020, 1022, 1024, 1026, and 1028 may be any suitable color palette. In some examples, the colors 1020, 1022, 1024, 1026, and 1028 can be gray, red, blue, green, and yellow, respectively.

It should be noted each region 1012 may include nodes of the same operator or nodes of different operators. The use of the color-coding by geographical locations rather than by operators alone and the enabling of the intra-color coordination can provide a tighter frequency reuse, and thus a better spectral efficiency. While FIG. 10 illustrates the color coding for four associative operator sets in the area 1010, the area 1010 can be mapped to a greater number of associative operator sets (e.g., about 5, 6, or more) or a less number of associative operator sets (e.g., about 2 or 3). In addition, while the regions 1012 are illustrated to include a hexagonal shape, the regions 1012 can be configured to include any suitable shape.

Figure 11:
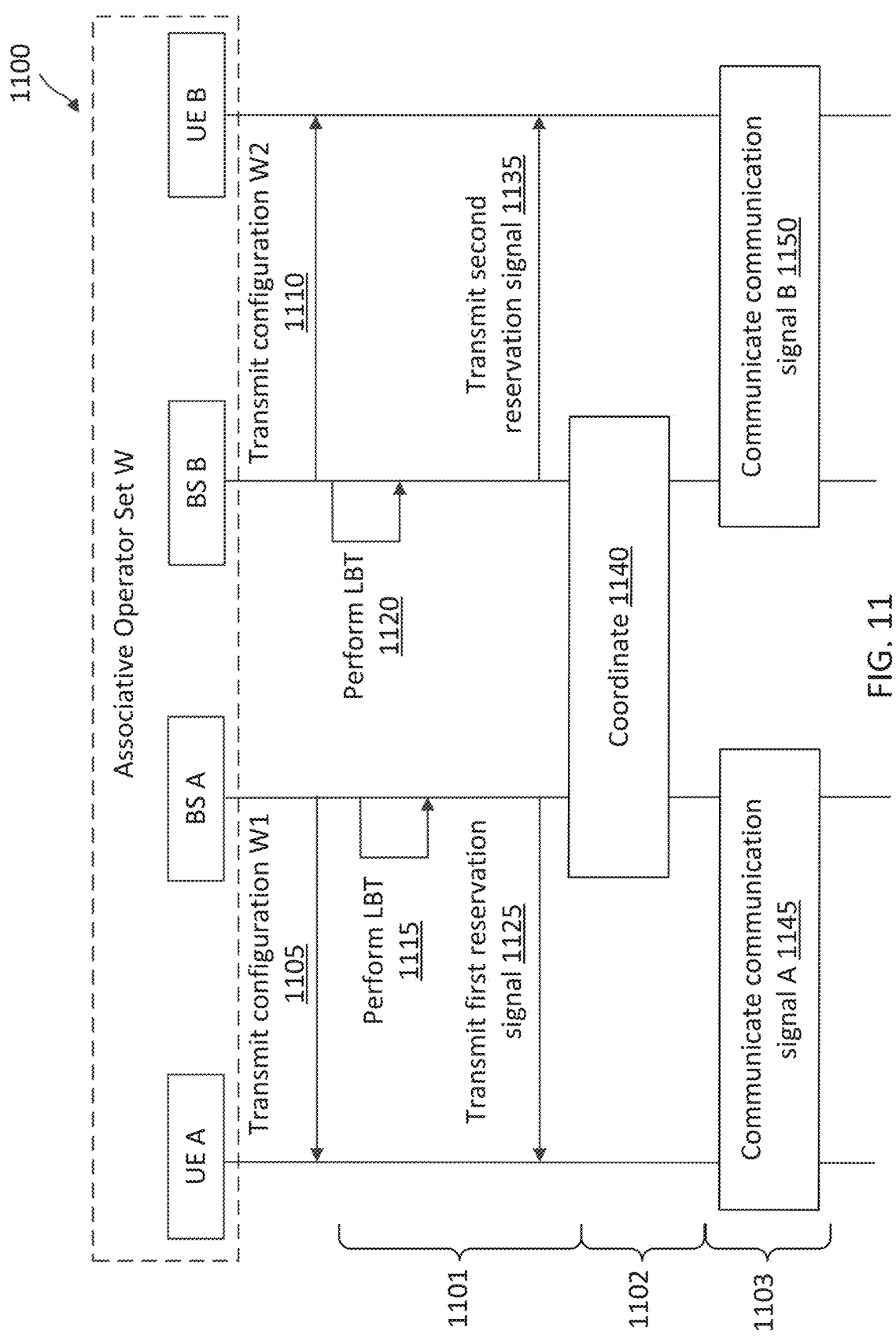
FIG. 11 is a signaling diagram illustrating a communication method implementing color-coded LBT according to some embodiments of the present disclosure.

FIG. 11 is a signaling diagram illustrating a communication method 1100 implementing color-coded LBT according to some embodiments of the present disclosure. The method 1100 is implemented by a BS A serving a UE A and a BS B serving a UE B in a network over an unlicensed spectrum (e.g., the spectrum 201). The BS A and the BS B are similar to the BSs 105 and 400. The UE A and the UE B are similar to the UEs 115 and 300. The network is similar to the network 100. The BS A, BS B, UE A, and UE B are associated with the associative operator set W. However, the BS A and the UE A are operated by Operator A, while the BS B and the UE B are operated by Operator B. In an example, the BS A, the UE A, the BS B, and the UE B are located in the region W1 1012. The method 1100 may use similar mechanisms as in the schemes 500, 600, 900, and 1000 and the methods 700 and 800 described above with respect to FIGS. 5, 6, 9, 10, 7, and 8, respectively. Steps of the method 1100 can be executed by computing devices (e.g., a processor, processing circuit, and/or other suitable component) of the BS A, BS B, UE A, and UE B. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1105, the BS A transmits a first configuration to the UE A. The first configuration includes a waveform assignment for spectrum reservations. For example, the waveform assignment may indicate the waveform sequence $1010_{S(1)}$ based on an association of the BS A to the associative operator set W. The BS A may receive the assignment of the waveform sequence $1010_{S(1)}$ from a central control entity (e.g., a spectrum access system (SAS)).

Similarly, at step 1110, the BS B transmits a second configuration to the UE B. The second configuration includes a waveform assignment indicating the waveform sequence $1010_{S(1)}$. The BS B may receive the assignment of the waveform sequence $1010_{S(2)}$ from the central control entity.

At step 1115, the BS A performs an LBT in the spectrum, for example, during a contention period 1101. The contention period 1101 is for asynchronous LBTs, where each node may perform an LBT based on the node's own timeline. The LBT may be an energy detection-based LBT. The BS A may determine whether the channel is available by comparing a detected signal energy to a predetermine threshold. The BS A may use different thresholds for a reservation from the same operator A and for a reservation from a different Operator B. For example, the BS A determines that the channel is clear based on the LBT.

At step 1125, the BS A transmits a first reservation signal (e.g., the RRQ signals 220) to reserve a TXOP 1103 for communications with the UE A. The first reservation signal includes the waveform sequence $1010_{S(1)}$ identifying the associative operator set W.

At step 1120, the BS B performs an LBT (e.g., an energy detection-based LBT) during the contention period 1101 using substantially similar mechanisms as the BS A. For example, the BS B also passes the LBT. In an example, the BS B may use a more relaxed energy detection threshold when detecting the first reservation signal from the BS A belonging to the same associative operator set.

At step 1135, after passing the LBT, the BS B transmits a second reservation signal to reserve the TXOP 1103. The second reservation signal includes the waveform sequence $1010_{S(0)}$ identifying the associative operator set.

At step 1140, the winning BS A and BS B coordinate with each other to perform rate control during a rate control period 1102. The BS A and the BS B may negotiate with each to synchronize the rate control period 1102 to a slot boundary (e.g., a 1 ms slot boundary). The BS A and the BS B may cooperatively determine transmission parameters (e.g., MCSs, transmission power levels, beamforming parameters, and/or transmission ranks) for communications during the TXOP 1103. The BS A and the BS B may exchange signals (e.g., the signals 224) for the negotiations.

At step 1145, the BS A communicates a communication signal A (e.g., the communication signals 226) with the UE A during the TXOP 1103 based on transmission parameters negotiated during the rate control in the step 1135.

At step 1150, the BS B communicates a communication signal B (e.g., the communication signals 226) with the UE B during the TXOP 1103 based on transmission parameters negotiated during the rate control in the step 1135. In an example, the BS B may schedule the UE B such that the overlaying communication signal B ends before the end of the overlaid TXOP 1103.

Figure 12:
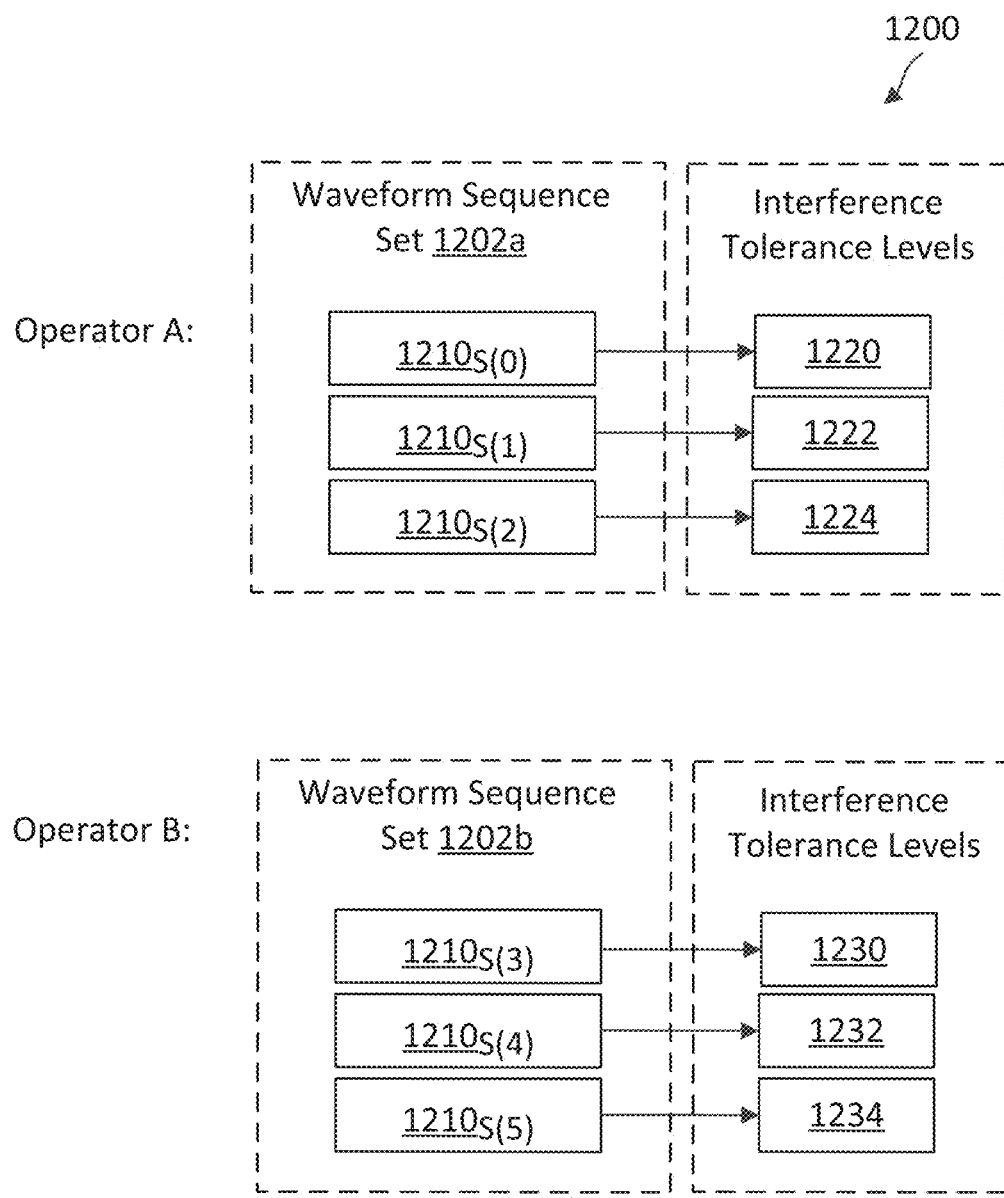
FIG. 12 illustrates a color-coded LBT configuration scheme according to some embodiments of the present disclosure.

FIG. 12 illustrates a color-coded LBT configuration scheme 1200 according to some embodiments of the present disclosure. The scheme 1200 may be employed by BSs such as the BSs 105 and 400 and UEs such as the UEs 115 and 300 in a network such as the network 100. The scheme 1200 is substantially similar to the scheme 500. However, the scheme 1200 assigns colors or waveform sequences at a finer granularity than the scheme 500. The scheme 1200 assigns multiple colors or waveform sequences to a particular operator to represent different interference levels. For example, the scheme 1200 assigns a set 1202a of unique waveform sequences $1210_{S(0)}$, $1210_{S(1)}$, and $1210_{S(2)}$ or colors to Operator A for spectrum reservations. Each of the waveform sequences $1210_{S(0)}$, $1210_{S(1)}$, and $1210_{S(2)}$ may indicate a particular interference level. For example, the waveform sequence $1210_{S(0)}$ represents a sub-color (e.g., dark red) indicating an interference tolerance level 1220 of about −52 dBm, the waveform sequence $1210_{S(1)}$ represents a sub-color (e.g., medium red) indicating an interference tolerance level 1222 of about −52 dBm, and the waveform sequence $1210_{S(2)}$ represents a sub-color (e.g., light red) indicating an interference tolerance level 1224 of about −72 dBm.

An Operator A node may transmit a reservation signal (e.g., the RRQ signals 220 and the RRS signals 222) to reserve a TXOP (e.g., the TXOPs 703, 801, 802, and 1103) by selecting a waveform sequence $1210_{S(0)}$, $1210_{S(1)}$, or $1210_{S(2)}$ based on an interference tolerance level for an intended communication in the TXOP. As such, when a monitoring node detects a reservation signal in the spectrum, the monitoring node may apply an energy detection threshold based on an interference tolerance level identified by the waveform of the detected reservation signal. The monitoring node may determine whether to yield spectrum access completely or overlay on top of a reserved TXOP based on the interference tolerance level. When the monitoring node determines to apply TXOP overlay, the monitoring node may adjust transmission parameters (e.g., MCSs, transmission power levels, beamforming parameters, and/or transmission ranks) according to the interference tolerance level.

Similarly, the scheme 1200 assigns a set 1202b of unique waveform sequences $1210_{S(3)}$, $1210_{S(4)}$, and $1210_{S(5)}$ or colors to Operator B for spectrum reservations. Each of the waveform sequences $1210_{S(3)}$, $1210_{S(4)}$, and $1210_{S(5)}$ may indicate a particular interference level. For example, the waveform sequence $1210_{S(3)}$ represents a sub-color (e.g., dark blue) indicating an interference tolerance level 1230 of about −52 dBm, the waveform sequence $1210_{S(4)}$ represents a sub-color (e.g., medium blue) indicating an interference tolerance level 1232 of about −52 dBm, and the waveform sequence $1210_{S(5)}$ represents a sub-color (e.g., light blue) indicating an interference tolerance level 1234 of about −72 dBm. Operator B nodes may employ substantially similar mechanisms as the Operator A nodes for monitoring with considerations for interference tolerance level.

While the scheme 1200 is illustrated with three sub-colors for each operator to indicate three different interference tolerance levels, the scheme 1200 may be alternatively configured to assign any suitable number of sub-colors (e.g., about 4, 5, or more) to each operator to indicate different interference tolerance levels. In addition, the interference tolerance levels 1220, 1222, 1224 of Operator A may be different from interference tolerance levels 1230, 1232, and 1234 of Operator B. Further, the scheme 1200 can be applied to the scheme 900, where each associative operator set may be assigned with multiple sub-colors to indicate different interference tolerance levels.

In general, each operator (e.g., Operator A, Operator B, Operator C, or Operator D in the scheme 500) may be assigned with multiple waveform sequences (e.g., the waveform sequences 510, 910, and 1210) to represent different information. Alternatively, each associative operator set (e.g., the associative operator set W, the associative operator set X, the associative operator set Y, and the associative operator set Z in the scheme 900) may be assigned with multiple waveform sequences to represent different information.

In an embodiment, an operator or an associative operator set may be assigned different sub-colors or waveform sequences (e.g., the waveform sequences 510, 910, and 1210) to represent a number of allowable overlays in a reserved TXOP (e.g., the TXOPs 703, 801, 802, and 1103). For example, a sub-color of green may represent one communication overlay is allowed during a reserved TXOP, whereas a sub-color of yellow may represent two communication overlays are allowed during a reserved TXOP.

In an embodiment, an operator or an associative operator set may operate over multiple frequency carriers or frequency channels. In such an embodiment, an operator or an associative operator set may be assigned different sub-colors or waveform sequences to represent different frequency carrier. For example, a sub-color of green may be assigned for reserving a TXOP in one first frequency carrier or channel, while a sub-color of yellow may be assigned for reserving a TXOP in another frequency carrier.

In an embodiment, an operator or an associative operator set may operate use different beams with different directions for transmissions and/or receptions. In such an embodiment, an operator or an associative operator set may be assigned different sub-colors or waveform sequences to represent different beam directions. For example, a sub-color of green may be assigned for reserving a TXOP in one beam direction, while a sub-color of yellow may be assigned for reserving a TXOP in another beam direction.

Figure 13:
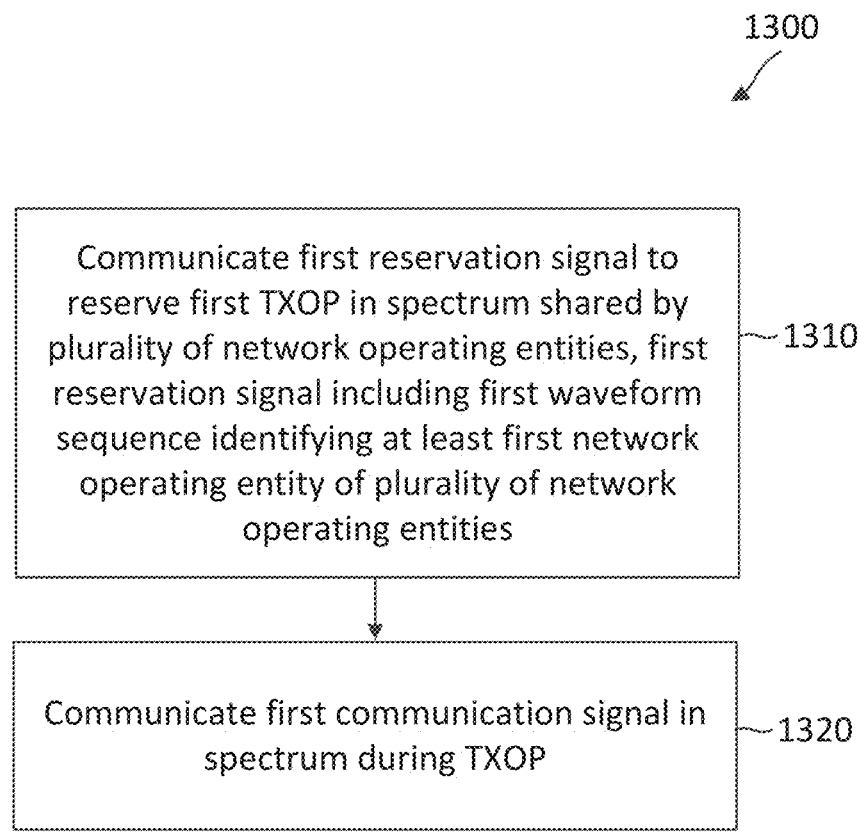
FIG. 13 is a flow diagram of a communication method implementing color-coded LBT according to some embodiments of the present disclosure.

FIG. 13 is a flow diagram of a communication method 1300 according to some embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the 105 and 400, may utilize one or more components, such as the processor 402, the memory 404, the LBT module 408, the communication module 409, the transceiver 410, and the one or more antennas 416, to execute the steps of method 1300. In another example, a wireless communication device, such as UEs 115 and 300, may utilize one or more components, such as the processor 302, the memory 304, the LBT module 308, the communication module 309, the transceiver 310, and the one or more antennas 316, to execute the steps of method 1300. The method 1300 may employ similar mechanisms as in the schemes 500, 600, 900, 1000, and 1200 and the methods 700, 800, and 1100 described with respect to FIGS. 5, 6, 10, 12, 7, 8, and 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes communicating, by a first wireless communication device with a second wireless communication device, a first reservation signal (e.g., the RRQ signals 220 and the RRS signals 222) to reserve a first TXOP (e.g., the TXOPs 703, 801, 802, and 1103) in a spectrum (e.g., the spectrum 201) shared by a plurality of network operating entities. The first reservation signal includes a first waveform sequence (e.g., the waveform sequences 510, 910, 1210) identifying at least a first network operating entity of the plurality of network operating entities associated with the first wireless communication device and the second wireless communication device.

At step 1320, the method 1300 includes communicating, by the first wireless communication device with the second wireless communication device, a first communication signal (e.g., the communication signals 226) in the spectrum during the TXOP.

In an embodiment, the first wireless communication device corresponds to a BS and the second wireless communication device corresponds to a UE. In another embodiment, the first wireless communication device corresponds to a UE and the second wireless communication device corresponds to a BS.

In an embodiment, the first wireless communication device further communicates, with the second wireless communication device, a configuration indicating an assignment of the first waveform sequence for reserving the first TXOP in the spectrum. For example, when the first wireless communication device is a BS and the second wireless communication device is a UE, the communicating includes transmitting the configuration to the second wireless communication device. Alternatively, when the first wireless communication device is a UE and the second wireless communication device is a BS, the communicating includes receiving the configuration from the second wireless communication device.

In an embodiment, the first wireless communication device further coordinates, with a third wireless communication device associated with a second network operating entity of the plurality of network operating entities, communications in the spectrum during the TXOP. The communications include the first communication signal and a second communication signal associated with the third wireless communication device. In one example, the first network operating entity and the second network operating entity correspond to the same network operating entity, where the coordination is intra-operator coordination. In another example, the first network operating entity and the second network operating entity are different network operating entities, where the first waveform sequence identifies a set of network operating entities (e.g., the associative operator sets W, X, Y, or Z) including the first network operating entity and the second network operating entity based on an association rule.

In an embodiment, the coordination includes determining a transmission timeline for the communications within the first TXOP. For example, the first wireless communication device and the third wireless communication device may negotiate to synchronize a rate control period (e.g., the rate control periods 206, 702, and 1102) to a slot boundary and synchronize a subsequent TXOP based on the slot boundary.

In an embodiment, coordination determining transmission parameters (e.g., MCSs, transmission power levels, beamforming parameters, and/or transmission ranks or spatial layers) for the communications within the first TXOP.

In an embodiment, the first wireless communication device further communicates a second reservation signal to reserve a second TXOP in the spectrum for communicating with a third wireless communication device associated with the first network operating entity. The second reservation signal includes a second waveform sequence different from the first waveform sequence. In an example, the first waveform sequence and the second waveform sequence are associated with at least one of different interference tolerance levels (e.g., the interference tolerance levels 1220, 1222, 1224, 1230, 1232, and 1234) or different transmission power levels, for example, as shown in the scheme 1200. The second waveform sequence identifies at least the first network operating entity. In another example, the second waveform sequence (e.g., the default waveform sequences $510_{S(0)}$ and $910_{S(0)}$) identifies a default network operating entity of the plurality of network operating entities.

In an embodiment, the first wireless communication device further receives, from a third wireless communication device, a second reservation signal reserving a second TXOP in the spectrum, the second reservation signal including a second waveform sequence. The first wireless communication device further determines whether to communicate with a fourth wireless communication device different from the third wireless communication device during the second TXOP based on an energy threshold associated with the second waveform sequence.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including communicating, by a first wireless communication device with a second wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the first wireless communication device and the second wireless communication device; and communicating, by the first wireless communication device with the second wireless communication device, a first communication signal in the spectrum during the TXOP.

The method may also include communicating, by the first wireless communication device with the second wireless communication device, a configuration indicating an assignment of the first waveform sequence for reserving the first TXOP in the spectrum. The method may also include coordinating, by the first wireless communication device with a third wireless communication device associated with a second network operating entity of the plurality of network operating entities, communications in the spectrum during the TXOP, the communications including the first communication signal and a second communication signal associated with the third wireless communication device. The method may also include where the first network operating entity and the second network operating entity correspond to a same network operating entity. The method may also include where the first network operating entity and the second network operating entity are different network operating entities, and where the first waveform sequence identifies a set of network operating entities including the first network operating entity and the second network operating entity based on an association rule. The method may also include where the coordinating includes coordinating, by the first wireless communication device with the third wireless communication device, to determine a transmission timeline for the communications within the first TXOP. The method may also include where the coordinating includes coordinating, by the first wireless communication device with the third wireless communication device, to determine transmission parameters for the communications within the first TXOP. The method may also include communicating, by the first wireless communication device, a second reservation signal to reserve a second TXOP in the spectrum for communicating with a third wireless communication device associated with the first network operating entity, the second reservation signal including a second waveform sequence different from the first waveform sequence. The method may also include where the first waveform sequence and the second waveform sequence are associated with at least one of different interference tolerance levels or different transmission power levels. The method may also include where the second waveform sequence identifies at least the first network operating entity. The method may also include where the second waveform sequence identifies a default network operating entity of the plurality of network operating entities. The method may also include receiving, by the first wireless communication device from a third wireless communication device, a second reservation signal reserving a second TXOP in the spectrum, the second reservation signal including a second waveform sequence; and determining, by the first wireless communication device, whether to communicate with a fourth wireless communication device different from the third wireless communication device during the second TXOP based on an energy threshold associated with the second waveform sequence.

Further embodiments of the present disclosure include an apparatus including a transceiver configured to communicate, with a first wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the apparatus and the first wireless communication device; and communicate, with the first wireless communication device, a first communication signal in the spectrum during the TXOP.

The apparatus may also include where the transceiver is further configured to communicate, with the first wireless communication device, a configuration indicating an assignment of the first waveform sequence for reserving the first TXOP in the spectrum. The apparatus may also include a processor configured to coordinate, with a second wireless communication device associated with a second network operating entity of the plurality of network operating entities, communications in the spectrum during the TXOP, the communications including the first communication signal and a second communication signal associated with the second wireless communication device. The apparatus may also include where the first network operating entity and the second network operating entity correspond to a same network operating entity. The apparatus may also include where the first network operating entity and the second network operating entity are different network operating entities, and where the first waveform sequence identifies a set of network operating entities including the first network operating entity and the second network operating entity based on an association rule. The apparatus may also include where the processor is further configured to coordinate the communications by coordinating, with the second wireless communication device, to determine a transmission timeline for the communications within the first TXOP. The apparatus may also include where the processor is further configured to coordinate the communications by coordinate, with the second wireless communication device, to determine transmission parameters for the communications within the first TXOP. The apparatus may also include where the transceiver is further configured to communicate a second reservation signal to reserve a second TXOP in the spectrum for communicating with a second wireless communication device associated with the first network operating entity, the second reservation signal including a second waveform sequence different from the first waveform sequence. The apparatus may also include where the first waveform sequence and the second waveform sequence are associated with at least one of different interference tolerance levels or different transmission power levels. The apparatus may also include where the second waveform sequence identifies at least the first network operating entity. The apparatus may also include where the second waveform sequence identifies a default network operating entity of the plurality of network operating entities. The apparatus may also include where the transceiver is further configured to receive, from a second wireless communication device, a second reservation signal reserving a second TXOP in the spectrum, the second reservation signal including a second waveform sequence, and where the apparatus further includes a processor configured to determine whether to communicate with a fourth wireless communication device different from the second wireless communication device during the second TXOP based on an energy threshold associated with the second waveform sequence.

Further embodiments of the present disclosure include a non-transitory computer-readable medium having program code recorded thereon, the program code including code for causing a first wireless communication device to communicate, with a second wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the first wireless communication device and the second wireless communication device; and code for causing the first wireless communication device to communicate, with the second wireless communication device, a first communication signal in the spectrum during the TXOP.

The non-transitory computer-readable medium code for causing the first wireless communication device to communicate, with the second wireless communication device, a configuration indicating an assignment of the first waveform sequence for reserving the first TXOP in the spectrum. The non-transitory computer-readable medium code for causing the first wireless communication device to coordinate, with a third wireless communication device associated with a second network operating entity of the plurality of network operating entities, communications in the spectrum during the TXOP, the communications including the first communication signal and a second communication signal associated with the third wireless communication device. The computer-readable medium where the first network operating entity and the second network operating entity correspond to a same network operating entity. The computer-readable medium where the first network operating entity and the second network operating entity are different network operating entities, and where the first waveform sequence identifies a set of network operating entities including the first network operating entity and the second network operating entity based on an association rule. The computer-readable medium where the code for causing the first wireless communication device to coordinate the communications is further configured to coordinate, with the third wireless communication device, to determine a transmission timeline for the communications within the first TXOP. The computer-readable medium where the code for causing the first wireless communication device to coordinate the communications is further configured to coordinate, with the third wireless communication device, to determine transmission parameters for the communications within the first TXOP. The non-transitory computer-readable medium code for causing the first wireless communication device to communicate a second reservation signal to reserve a second TXOP in the spectrum for communicating with a third wireless communication device associated with the first network operating entity, the second reservation signal including a second waveform sequence different from the first waveform sequence. The computer-readable medium where the first waveform sequence and the second waveform sequence are associated with at least one of different interference tolerance levels or different transmission power levels. The computer-readable medium where the second waveform sequence identifies at least the first network operating entity. The computer-readable medium where the second waveform sequence identifies a default network operating entity of the plurality of network operating entities. The non-transitory computer-readable medium code for causing the first wireless communication device to receive, from a third wireless communication device, a second reservation signal reserving a second TXOP in the spectrum, the second reservation signal including a second waveform sequence; and code for causing the first wireless communication device to determine whether to communicate with a fourth wireless communication device different from the third wireless communication device during the second TXOP based on an energy threshold associated with the second waveform sequence.

Further embodiments of the present disclosure include an apparatus including means for communicating, with a first wireless communication device, a first reservation signal to reserve a first transmission opportunity (TXOP) in a spectrum shared by a plurality of network operating entities, the first reservation signal including a first waveform sequence identifying at least a first network operating entity of the plurality of network operating entities associated with the apparatus and the first wireless communication device; and means for communicating, with the first wireless communication device, a first communication signal in the spectrum during the TXOP.

The apparatus may also include means for communicating, with the first wireless communication device, a configuration indicating an assignment of the first waveform sequence for reserving the first TXOP in the spectrum. The apparatus may also include means for coordinating, with a second wireless communication device associated with a second network operating entity of the plurality of network operating entities, communications in the spectrum during the TXOP, the communications including the first communication signal and a second communication signal associated with the second wireless communication device. The apparatus may also include where the first network operating entity and the second network operating entity correspond to a same network operating entity. The apparatus may also include where the first network operating entity and the second network operating entity are different network operating entities, and where the first waveform sequence identifies a set of network operating entities including the first network operating entity and the second network operating entity based on an association rule. The apparatus may also include where the means for coordinating the communications is further configured to coordinate, with the second wireless communication device, to determine a transmission timeline for the communications within the first TXOP. The apparatus may also include where the means for coordinating the communications is further configured to coordinate, with the second wireless communication device, to determine transmission parameters for the communications within the first TXOP. The apparatus may also include means for communicating a second reservation signal to reserve a second TXOP in the spectrum for communicating with a second wireless communication device associated with the first network operating entity, the second reservation signal including a second waveform sequence different from the first waveform sequence. The apparatus may also include where the first waveform sequence and the second waveform sequence are associated with at least one of different interference tolerance levels or different transmission power levels. The apparatus may also include where the second waveform sequence identifies at least the first network operating entity. The apparatus may also include where the second waveform sequence identifies a default network operating entity of the plurality of network operating entities. The apparatus may also include means for receiving, from a second wireless communication device, a second reservation signal reserving a second TXOP in the spectrum, the second reservation signal including a second waveform sequence; and means for determining whether to communicate with a fourth wireless communication device different from the second wireless communication device during the second TXOP based on an energy threshold associated with the second waveform sequence.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
  communicating, by a first wireless communication device with a second wireless communication device, a first reservation signal including a first waveform sequence to reserve a first transmission opportunity (TXOP) in an unlicensed spectrum shared by a plurality of network operating entities, wherein the first wireless communication device and the second wireless communication device are associated with a first network operating entity of the plurality of network operating entities; and
  communicating, by the first wireless communication device with the second wireless communication device, a first communication signal in the spectrum during the TXOP based on whether the first reservation signal is from the first network operating entity that is associated with the first wireless communication device and the second wireless communication device, and the first waveform sequence.

2. The method of claim 1, further comprising:
  communicating, by the first wireless communication device with the second wireless communication device, a configuration indicating an assignment of the first waveform sequence for reserving the first TXOP in the unlicensed spectrum.

3. The method of claim 1, further comprising:
  coordinating, by the first wireless communication device with a third wireless communication device associated with a second network operating entity of the plurality of network operating entities, communications in the unlicensed spectrum during the TXOP, the communications including the first communication signal and a second communication signal associated with the third wireless communication device.

4. The method of claim 3, wherein the first network operating entity and the second network operating entity correspond to a same network operating entity.

5. The method of claim 3, wherein the first network operating entity and the second network operating entity are different network operating entities, and wherein the first waveform sequence identifies a set of network operating entities including the first network operating entity and the second network operating entity based on an association rule.

6. The method of claim 3, wherein the coordinating includes:

coordinating, by the first wireless communication device with the third wireless communication device, to determine a transmission timeline for the communications within the first TXOP.

7. The method of claim 3, wherein the coordinating includes:

coordinating, by the first wireless communication device with the third wireless communication device, to determine a transmission parameter for the communications within the first TXOP.

8. The method of claim 1, further comprising:

communicating, by the first wireless communication device, a second reservation signal to reserve a second TXOP in the unlicensed spectrum for communicating with a third wireless communication device associated with the first network operating entity, the second reservation signal including a second waveform sequence different from the first waveform sequence.

9. The method of claim 8, wherein the first waveform sequence and the second waveform sequence are associated with at least one of different interference tolerance levels or different transmission power levels.

10. The method of claim 9, wherein the second waveform sequence identifies at least the first network operating entity.

11. The method of claim 9, wherein the second waveform sequence identifies a default network operating entity of the plurality of network operating entities.

12. The method of claim 1, further comprising:

receiving, by the first wireless communication device from a third wireless communication device, a second reservation signal reserving a second TXOP in the unlicensed spectrum, the second reservation signal including a second waveform sequence; and determining, by the first wireless communication device, whether to communicate with a fourth wireless communication device different from the third wireless communication device during the second TXOP based on an energy threshold associated with the second waveform sequence.

13. An apparatus comprising:

a transceiver configured to:

communicate, with a first wireless communication device, a first reservation signal to reserve a first transmission opportunity (TXOP) in an unlicensed spectrum shared by a plurality of network operating entities, wherein the apparatus and the first wireless communication device are associated with a first network operating entity of the plurality of network operating entities; and communicate, with the first wireless communication device, a first communication signal in the unlicensed spectrum during the TXOP based on whether the first reservation signal is from the first network operating entity that is associated with the first wireless communication device and the second wireless communication device, and the first waveform sequence.

14. The apparatus of claim 13, wherein the transceiver is further configured to:

communicate, with the first wireless communication device, a configuration indicating an assignment of the first waveform sequence for reserving the first TXOP in the unlicensed spectrum.

15. The apparatus of claim 13, further comprising:

a processor configured to coordinate, with a second wireless communication device associated with a second network operating entity of the plurality of network operating entities, communications in the unlicensed spectrum during the TXOP, the communications including the first communication signal and a second communication signal associated with the second wireless communication device.

16. The apparatus of claim 15, wherein the first network operating entity and the second network operating entity correspond to a same network operating entity.

17. The apparatus of claim 15, wherein the first network operating entity and the second network operating entity are different network operating entities, and wherein the first waveform sequence identifies a set of network operating entities including the first network operating entity and the second network operating entity based on an association rule.

18. The apparatus of claim 15, wherein the processor is further configured to coordinate the communications by:

coordinating, with the second wireless communication device, to determine at least one of a transmission timeline for the communications within the first TXOP or a transmission parameter for the communications within the first TXOP.

19. The apparatus of claim 13, wherein the transceiver is further configured to:

communicate a second reservation signal to reserve a second TXOP in the unlicensed spectrum for communicating with a second wireless communication device associated with the first network operating entity, the second reservation signal including a second waveform sequence different from the first waveform sequence, and wherein the first waveform sequence and the second waveform sequence are associated with at least one of different interference tolerance levels or different transmission power levels.

20. The apparatus of claim 19, wherein the second waveform sequence identifies at least one of the first network operating entity or a default network operating entity of the plurality of network operating entities.

21. The apparatus of claim 13, wherein the transceiver is further configured to:

receive, from a second wireless communication device, a second reservation signal reserving a second TXOP in the unlicensed spectrum, the second reservation signal including a second waveform sequence, and wherein the apparatus further comprises a processor configured to:

determine whether to communicate with a fourth wireless communication device different from the second wireless communication device during the second TXOP based on an energy threshold associated with the second waveform sequence.

22. A non-transitory computer-readable medium having program code recorded thereon, the program code comprising:

code for causing a first wireless communication device to communicate, with a second wireless communication device, a first reservation signal including a first waveform sequence to reserve a first transmission opportunity (TXOP) in an unlicensed spectrum shared by a plurality of network operating entities, wherein the first wireless communication device and the second wireless communication device are associated with a first network operating entity of the plurality of network operating entities; and code for causing the first wireless communication device to communicate, with the second wireless communication device, a first communication signal in the unlicensed spectrum during the TXOP based on whether the first reservation signal is from the first network operating entity that is associated with the first wireless communication device and the second wireless communication device, and the first waveform sequence.

23. The non-transitory computer-readable medium of claim 22, further comprising:

code for causing the first wireless communication device to communicate, with the second wireless communication device, a configuration indicating an assignment of the first waveform sequence for reserving the first TXOP in the unlicensed spectrum.

24. The non-transitory computer-readable medium of claim 22, further comprising:

code for causing the first wireless communication device to coordinate, with a third wireless communication device associated with a second network operating entity of the plurality of network operating entities, communications in the unlicensed spectrum during the TXOP, the communications including the first communication signal and a second communication signal associated with the third wireless communication device.

25. The non-transitory computer-readable medium of claim 24, wherein the first network operating entity and the second network operating entity correspond to a same network operating entity.

26. The non-transitory computer-readable medium of claim 24, wherein the first network operating entity and the second network operating entity are different network operating entities, and wherein the first waveform sequence identifies a set of network operating entities including the first network operating entity and the second network operating entity based on an association rule.

27. The non-transitory computer-readable medium of claim 24, wherein the code for causing the first wireless communication device to coordinate the communications is further configured to:

coordinate, with the third wireless communication device, to determine at least one of a transmission timeline for the communications within the first TXOP or a transmission parameter for the communications within the first TXOP.

28. The non-transitory computer-readable medium of claim 22, further comprising:

code for causing the first wireless communication device to communicate a second reservation signal to reserve a second TXOP in the unlicensed spectrum for communicating with a third wireless communication device associated with the first network operating entity, the second reservation signal including a second waveform sequence different from the first waveform sequence, wherein the first waveform sequence and the second waveform sequence are associated with at least one of different interference tolerance levels or different transmission power levels.

29. The non-transitory computer-readable medium of claim 28, wherein the second waveform sequence identifies at least one of the first network operating entity or a default network operating entity of the plurality of network operating entities.

30. The non-transitory computer-readable medium of claim 22, further comprising:

code for causing the first wireless communication device to receive, from a third wireless communication device, a second reservation signal reserving a second TXOP in the unlicensed spectrum, the second reservation signal including a second waveform sequence; and code for causing the first wireless communication device to determine whether to communicate with a fourth wireless communication device different from the third wireless communication device during the second TXOP based on an energy threshold associated with the second waveform sequence.

* * * * *